(12) United States Patent
Cronin

(10) Patent No.: US 12,227,108 B2
(45) Date of Patent: Feb. 18, 2025

(54) SYSTEM AND METHOD FOR ENERGY MANAGEMENT OF A POWER PACK FOR AN ELECTRIC VEHICLE INCLUDING PHOTOVOLTAIC CHARGING

(71) Applicant: SUSTAINABLE ENERGY TECHNOLOGIES, INC., Wilmington, DE (US)

(72) Inventor: John Cronin, Wilmington, DE (US)

(73) Assignee: SUSTAINABLE ENERGY TECHNOLOGIES, INC., Wilmington, DE (US)

( * ) Notice: Subject to any disclaimer, the term of this patent is extended or adjusted under 35 U.S.C. 154(b) by 0 days.

(21) Appl. No.: 18/075,299

(22) Filed: Dec. 5, 2022

(65) Prior Publication Data

US 2024/0181927 A1    Jun. 6, 2024

Related U.S. Application Data

(60) Provisional application No. 63/285,872, filed on Dec. 3, 2021.

(51) Int. Cl.
*B60L 58/18*    (2019.01)
*B60L 7/10*    (2006.01)
(Continued)

(52) U.S. Cl.
CPC .............. *B60L 58/18* (2019.02); *B60L 7/10* (2013.01); *B60L 50/40* (2019.02); *B60L 50/60* (2019.02);
(Continued)

(58) Field of Classification Search
CPC .. B60L 58/18; B60L 7/10; B60L 50/40; B60L 50/60; B60L 53/51; B60L 58/12;
(Continued)

(56) References Cited

U.S. PATENT DOCUMENTS 6,011,379 A    1/2000   Singh et al.
6,724,102 B1   4/2004   Kelwaski et al.
(Continued)

FOREIGN PATENT DOCUMENTS

CN    104057901    9/2014
CN    106252096    12/2016
(Continued)

OTHER PUBLICATIONS

U.S. Appl. No. 17/976,674, John Cronin, A Modular Power Pack Energy Storage Unit, filed Oct. 28, 2022.
(Continued)

*Primary Examiner* — Lincoln D Donovan
*Assistant Examiner* — Alex W Lam
(74) *Attorney, Agent, or Firm* — Polsinelli LLP

(57) ABSTRACT

Disclosed herein are systems and methods for energy management. A system, such as a vehicle, includes power packs and a photovoltaic array with interconnected photovoltaic cells that supplies electric charge to the power packs for charging the power packs. A charge management database stores data tracking respective charge cycles of the power packs based on the charging and discharging of the power packs. An energy control system controls flow of power in the system to control the charging and the discharging of the power packs, optimizes the flow of power in the system based on the respective charge cycles as tracked in the data stored in the charge management database, and updates the charge management database based on the optimization(s). An output interface outputs a status of the power packs based on the flow of power, for instance to indicate effect(s) of the optimization(s) on the power packs.

20 Claims, 12 Drawing Sheets

(51) Int. Cl.
*B60L 50/40* (2019.01)
*B60L 50/60* (2019.01)
*B60L 53/51* (2019.01)
*B60L 58/12* (2019.01)
*H02J 7/00* (2006.01)
*H02J 7/35* (2006.01)
*B60L 7/00* (2006.01)

(52) U.S. Cl.
CPC .......... *B60L 53/51* (2019.02); *H02J 7/00032* (2020.01); *H02J 7/0013* (2013.01); *H02J 7/0048* (2020.01); *H02J 7/0063* (2013.01); *H02J 7/00712* (2020.01); *H02J 7/35* (2013.01); *B60L 58/12* (2019.02); *H02J 2207/50* (2020.01); *H02J 2300/24* (2020.01)

(58) Field of Classification Search
CPC .... H02J 7/00032; H02J 7/0013; H02J 7/0048; H02J 7/0063; H02J 7/00712; H02J 7/35; H02J 2207/50; H02J 2300/24
See application file for complete search history.

(56) References Cited

U.S. PATENT DOCUMENTS

| | | | |
|---|---|---|---|
| 7,548,894 B2 | 6/2009 | Fuji | |
| 8,881,832 B2 | 11/2014 | McMillon et al. | |
| 8,950,662 B2 | 2/2015 | Soborski | |
| 9,053,870 B2 | 6/2015 | Yu et al. | |
| 9,056,556 B1 | 6/2015 | Hyde et al. | |
| 9,070,505 B2 | 6/2015 | Saitoh | |
| 9,079,505 B1 | 7/2015 | Hyde et al. | |
| 9,145,760 B2 | 9/2015 | McMillon et al. | |
| 9,169,719 B2 | 10/2015 | McMillon et al. | |
| 9,233,860 B2 | 1/2016 | Liu et al. | |
| 9,318,271 B2 | 4/2016 | Fletcher et al. | |
| 9,379,546 B2 | 6/2016 | Li | |
| 9,519,942 B2 | 12/2016 | Soborski | |
| 9,940,572 B2 | 4/2018 | Soborski | |
| 10,061,958 B2 | 8/2018 | Voigt et al. | |
| 10,173,663 B1 | 1/2019 | Combs | |
| 10,235,597 B2 | 3/2019 | Voigt et al. | |
| 10,380,601 B2 | 8/2019 | Soborski | |
| 10,826,304 B1 | 11/2020 | Thomas et al. | |
| 12,179,608 B2 | 12/2024 | Cronin | |
| 2004/0036475 A1 | 2/2004 | Pascoe et al. | |
| 2005/0057098 A1 | 3/2005 | Bouchon | |
| 2006/0132102 A1* | 6/2006 | Harvey ............... | G05F 1/67 320/166 |
| 2006/0178170 A1 | 8/2006 | Chung et al. | |
| 2006/0284617 A1 | 12/2006 | Kozlowski et al. | |
| 2006/0285617 A1 | 12/2006 | Roberts et al. | |
| 2007/0080662 A1 | 4/2007 | Wu | |
| 2007/0258188 A1 | 11/2007 | Shiue et al. | |
| 2008/0276825 A1 | 11/2008 | King et al. | |
| 2009/0021871 A1 | 1/2009 | Moran et al. | |
| 2010/0060231 A1 | 3/2010 | Trainor et al. | |
| 2010/0116574 A1 | 5/2010 | Gilmore | |
| 2010/0123436 A1 | 5/2010 | Herrod et al. | |
| 2010/0225282 A1 | 9/2010 | Paasch | |
| 2010/0305792 A1 | 12/2010 | Wilk et al. | |
| 2011/0003188 A1 | 1/2011 | Cheng et al. | |
| 2011/0080133 A1 | 4/2011 | Tamburrino et al. | |
| 2012/0029724 A1 | 2/2012 | Formanski et al. | |
| 2012/0041626 A1 | 2/2012 | Kelty et al. | |
| 2012/0049621 A1 | 3/2012 | Shinoda | |
| 2012/0062186 A1 | 3/2012 | Dessirier et al. | |
| 2012/0136535 A1 | 5/2012 | Buford et al. | |
| 2012/0183815 A1 | 7/2012 | Johnston et al. | |
| 2012/0187906 A1 | 7/2012 | Martienssen et al. | |
| 2012/0293077 A1* | 11/2012 | Tousain ............... | H05B 47/105 315/297 |
| 2013/0030630 A1 | 1/2013 | Luke et al. | |
| 2013/0033203 A1 | 2/2013 | Luke et al. | |
| 2013/0162037 A1 | 6/2013 | Kim et al. | |
| 2013/0179061 A1 | 7/2013 | Gadh et al. | |
| 2013/0181680 A1 | 7/2013 | Chau | |
| 2013/0188283 A1 | 7/2013 | Midholm et al. | |
| 2014/0129040 A1 | 5/2014 | Emadi et al. | |
| 2015/0046012 A1* | 2/2015 | Chen ................... | B60L 3/12 701/22 |
| 2015/0047844 A1 | 2/2015 | McMillon et al. | |
| 2015/0077054 A1 | 3/2015 | Uyeki | |
| 2015/0274030 A1 | 10/2015 | Payne et al. | |
| 2015/0275788 A1 | 10/2015 | Dufford et al. | |
| 2016/0079633 A1 | 3/2016 | Wahlstrom et al. | |
| 2016/0167677 A1 | 6/2016 | Schaefer et al. | |
| 2016/0176298 A1 | 6/2016 | Watson et al. | |
| 2016/0283842 A1 | 9/2016 | Pescianschi | |
| 2016/0288666 A1 | 10/2016 | Kim et al. | |
| 2016/0297316 A1 | 10/2016 | Penilla et al. | |
| 2016/0301246 A1 | 10/2016 | Sato | |
| 2016/0349330 A1 | 12/2016 | Barfield, Jr. et al. | |
| 2016/0365833 A1 | 12/2016 | Saby et al. | |
| 2016/0375780 A1 | 12/2016 | Penilla et al. | |
| 2016/0375786 A1 | 12/2016 | Liu | |
| 2016/0380455 A1 | 12/2016 | Greening et al. | |
| 2017/0001585 A1* | 1/2017 | Fink ................... | H02J 7/34 |
| 2017/0109467 A1 | 4/2017 | Shimizu | |
| 2017/0234251 A1 | 8/2017 | Commenda et al. | |
| 2018/0074132 A1 | 3/2018 | Day et al. | |
| 2018/0134171 A1 | 5/2018 | Hyde et al. | |
| 2018/0137991 A1 | 5/2018 | Roumi et al. | |
| 2018/0236887 A1 | 8/2018 | Sarkar et al. | |
| 2018/0283887 A1 | 10/2018 | Dudar et al. | |
| 2019/0031125 A1 | 1/2019 | Rozman et al. | |
| 2019/0061541 A1 | 2/2019 | Penilla et al. | |
| 2019/0097362 A1 | 3/2019 | Haba et al. | |
| 2019/0107406 A1 | 4/2019 | Cox et al. | |
| 2019/0180949 A1 | 6/2019 | Liu et al. | |
| 2019/0196851 A1 | 6/2019 | Penilla et al. | |
| 2020/0070679 A1 | 3/2020 | Wang et al. | |
| 2020/0079223 A1 | 3/2020 | Puri et al. | |
| 2020/0094810 A1 | 3/2020 | Moreland | |
| 2020/0247239 A1 | 8/2020 | Stoltz | |
| 2020/0328622 A1 | 10/2020 | Abu Qahouq | |
| 2020/0365336 A1 | 11/2020 | Luo et al. | |
| 2021/0005939 A1 | 1/2021 | Tajima et al. | |
| 2021/0083345 A1 | 3/2021 | Ciaccio et al. | |
| 2021/0088591 A1 | 3/2021 | Naha et al. | |
| 2021/0123975 A1 | 4/2021 | Sarwat et al. | |
| 2021/0138927 A1 | 5/2021 | Maeng et al. | |
| 2021/0190868 A1* | 6/2021 | Benoit ................ | H01M 10/48 |
| 2021/0202989 A1 | 7/2021 | Lee et al. | |
| 2021/0237578 A1 | 8/2021 | Ing | |
| 2021/0284043 A1 | 9/2021 | Wang et al. | |
| 2023/0136195 A1 | 5/2023 | Cronin | |
| 2023/0170732 A1 | 6/2023 | Cronin | |
| 2023/0173923 A1 | 6/2023 | Cronin | |
| 2023/0173936 A1 | 6/2023 | Cronin | |
| 2023/0173949 A1 | 6/2023 | Cronin | |
| 2023/0174041 A1 | 6/2023 | Cronin | |
| 2023/0176635 A1 | 6/2023 | Cronin | |
| 2023/0182580 A1 | 6/2023 | Cronin | |
| 2023/0182616 A1 | 6/2023 | Cronin | |
| 2023/0182617 A1 | 6/2023 | Cronin | |
| 2023/0182621 A1 | 6/2023 | Cronin | |
| 2023/0187960 A1 | 6/2023 | Cronin | |
| 2023/0192063 A1 | 6/2023 | Cronin | |
| 2023/0211667 A1 | 7/2023 | Cronin | |
| 2023/0216317 A1 | 7/2023 | Cronin | |
| 2023/0223784 A1 | 7/2023 | Cronin | |
| 2023/0326268 A1 | 10/2023 | Cronin | |

FOREIGN PATENT DOCUMENTS

| | | |
|---|---|---|
| CN | 106252099 | 12/2016 |
| CN | 109888904 | 10/2020 |
| EP | 2 278 677 | 1/2011 |
| WO | WO 2014/107151 | 7/2014 |
| WO | 2014/165197 A1 | 10/2014 |
| WO | WO 2015/016965 | 2/2015 |
| WO | WO 2018/041095 | 3/2018 |

(56) References Cited

FOREIGN PATENT DOCUMENTS

| | | |
|---|---|---|
| WO | WO 2018/106799 | 6/2018 |
| WO | 2018/231932 A1 | 12/2018 |
| WO | 2019/224527 A1 | 11/2019 |
| WO | 2020/240148 A2 | 12/2020 |
| WO | WO 2021/122753 | 6/2021 |
| WO | 2023/076632 A1 | 5/2023 |
| WO | WO 2023/102265 | 6/2023 |
| WO | WO 2023/102266 | 6/2023 |
| WO | WO 2023/102267 | 6/2023 |
| WO | WO 2023/102269 | 6/2023 |
| WO | WO 2023/102274 | 6/2023 |
| WO | WO 2023/107502 | 6/2023 |
| WO | WO 2023/107503 | 6/2023 |
| WO | WO 2023/107504 | 6/2023 |
| WO | WO 2023/107505 | 6/2023 |
| WO | WO 2023/107513 | 6/2023 |
| WO | WO 2023/107514 | 6/2023 |
| WO | WO 2023/107752 | 6/2023 |
| WO | WO 2023/114326 | 6/2023 |
| WO | WO 2023/129639 | 7/2023 |
| WO | WO 2023/129707 | 7/2023 |
| WO | WO 2023/129739 | 7/2023 |
| WO | WO 2023/215003 | 11/2023 |

OTHER PUBLICATIONS

U.S. Appl. No. 18/075,333, John Cronin, Modular Multi-Type Power Pack Charging Apparatus, filed Dec. 5, 2022.
U.S. Appl. No. 18/075,338, John Cronin, Integrated Power System and Method for Energy Management for Electric Vehicle, filed Dec. 5, 2022.
U.S. Appl. No. 18/075,358, John Cronin, Monitoring and Managing Temperature of Power Packs, filed Dec. 5, 2022.
U.S. Appl. No. 18/075,402, John Cronin, Modular Power Pack Energy Storage Unit, filed Dec. 5, 2022.
U.S. Appl. No. 18/076,248, John Cronin, Charge Compatible Supercapacitor System, filed Dec. 6, 2022.
U.S. Appl. No. 18/076,255, John Cronin, Evaluating and Managing Supercapacitors of Electric Vehicles, filed Dec. 6, 2022.
U.S. Appl. No. 18/076,283, John Cronin, Electric Vehicle Supercapacitor Thermal Management, filed Dec. 6, 2022.
U.S. Appl. No. 18/076,358, John Cronin, Charging Electric Vehicle Supercapacitors Using Solar Energy, filed Dec. 6, 2022.
U.S. Appl. No. 18/076,259, John Cronin, System and Method for Determining Range and Capacity of Supercapacitor Battery Storage for Electric Vehicle, filed Dec. 6, 2022.
U.S. Appl. No. 18/076,266, John Cronin, System and Method for User-Defined Electric Vehicle Supercapacitor Batteries, filed Dec. 6, 2022.
U.S. Appl. No. 18/076,321, John Cronin, System and Method for Analyzing Temperature Changes in Supercapacitor Battery Storage for Electric Vehicle, filed Dec. 6, 2022.
U.S. Appl. No. 18/079,841, John Cronin, Method and Systems to Trickle Charge Electric Vehicle's Supercapacitors Using Solar Energy, filed Dec. 12, 2022.
U.S. Appl. No. 18/081,508, John Cronin, Retrofitting an Electric Vehicle With a Intelligent Supercapacitor Battery Unit, filed Dec. 14, 2022.
U.S. Appl. No. 18/092,028, John Cronin, Supercapacitor System With a On Board Computing and Charging Capability, filed Dec. 30, 2022.
U.S. Appl. No. 18/090,695, John Cronin, Supercapacitor System With an Over Voltage Protection Capability, filed Dec. 29, 2022.
U.S. Appl. No. 18/091,369, John Cronin, Supercapacitor System With Temperature Control, filed Dec. 30, 2022.
PCT Application No. PCT/US22/51881 Invitation to Pay Additional Fees dated Mar. 2, 2023.
PCT Application No. PCT/US2022/051867 International Search Report and Written Opinion dated Mar. 7, 2023.
PCT Application No. PCT/US22/52033 International Search Report and Written Opinion dated Mar. 8, 2023.
PCT Application No. PCT/US22/52049 International Search Report and Written Opinion dated Mar. 8, 2023.
PCT Application No. PCT/US2022/048287 International Search Report and Written Opinion dated Mar. 10, 2023.
PCT Application No. PCT/US22/52035 International Search Report and Written Opinion dated Mar. 14, 2023.
PCT Application No. PCT/US2022/051863 International Search Report and Written Opinion dated Mar. 17, 2023.
PCT Application No. PCT/US22/52034 International Search Report and Written Opinion dated Mar. 20, 2023.
PCT Application No. PCT/US22/52890 International Search Report and Written Opinion dated Mar. 20, 2023.
PCT Application No. PCT/US22/52045 International Search Report and Written Opinion dated Mar. 21, 2023.
PCT Application No. PCT/US22/52036 International Search Report and Written Opinion dated Mar. 30, 2023.
PCT Application No. PCT/US22/52602 International Search Report and Written Opinion dated Apr. 4, 2023.
PCT Application No. PCT/US22/51870 International Search Report and Written Opinion dated Apr. 5, 2023.
PCT Application No. PCT/US22/54334 International Search Report and Written Opinion dated Apr. 5, 2023.
PCT Application No. PCT/US22/54386 International Search Report and Written Opinion dated Apr. 12, 2023.
PCT Application No. PCT/US22/54226 International Search Report and Written Opinion dated Apr. 18, 2023.
PCT Application No. PCT/US2022/051865 International Search Report and Written Opinion dated May 2, 2023.
Sarwar et al. "Experimental analysis of Hybridised Energy Storage Systems for automotive applications." Journal of Power Sources 324 (2016): 388-401. Aug. 30, 2016 (Aug. 30, 2016) Retrieved on Feb. 11, 2023 (Feb. 11, 2023) from <https://www.sciencedirect.com/science/article/abs/pii/80378775316306784>.
"200-MHz 16×16 Video Crosspoint Switch IC," Analogue Dialogue, Apr. 1997, vol. 31, No. 2, 25 pages; https://www.analog.com/en/analog-dialogue/articles/200-mhz-16x16-video-crosspoint-switch-ic.html.
"8×8 Analog Crosspoint Switches Analog & Digital Crosspoint ICs," Mouser Electronics, [Downloaded on Internet: Feb. 21, 2023], 5 pages, https://www.mouser.com/c/semiconductors/communication-networking-ics/analog-digital-crosspoint-ics.
Camara et al., "Polynomial Control Method of DC/DC Converters for DC-Bus Voltage and Currents Management—Battery and Supercapacitors," IEEE Transaction on Power Electronics, vol. 27, No. 3 (Mar. 2012): 1455-1467, DOI: 10.1109/TPEL.2011.2164581.
Crossbar Switch—Wikipedia, [Downloaded from Internet: Feb. 21, 2023], 7 pages; https://en.wikipedia.org/wiki/Crossbar_switch.
Danila et al., Elena; "Dynamic Modelling of Supercapacitor Using Artificial Neural Network Technique," International Conference and Exposition on Electrical and Power Engineering, Oct. 2014, DOI: 10.1109/ICEPE.2014.6969988 and https://www.researchgate.net/publication/270888480_Dynamic_Modelling_of_Supercapacitor_Using_Artificial_Neural_Network_Technique.
"Details, datasheet, quote on part No. BQ24640RVAR—High Efficienty Synchronous Switch-Mode Battery Charge Controller for Super Capacitors," Texas Instruments, SLUSA44A—Mar. 2010—Revised Jul. 2015, 31 pages, https://www.digchip.com/datasheets/%203258066-bq24640rvar.html.
"Digital Crosspoint Switches," MicroSemi Corp. (Aliso Viego, CA), [Downloadaed from Internet Feb. 21, 2023], 2 pages, https://www.microsemi.com/product-directory/signal-integrity/3579-digital-crosspoint-switches.
Eddahech et al., Akram; "Modeling and adaptive control for supercapacitor in automotive applications based on artificial neural networks," Electric Power Systems Research, vol. 106 (Jan. 2014): 134-141, https://www.sciencedirect.com/science/article/abs/pii/S0378779613002265.
Ge et al., Yuru; "How to measure and report the capacity of electrochemical double layers, supercapacitors, and their electrode

(56) References Cited

OTHER PUBLICATIONS materials," Journal of Solid State Electrochemistry, vol. 24 (2020): 3215-3230, https://link.springer.com/article/10.1007/s10008-020-04804-x.
Haddoun, Abdelhakim; "Modeling, Analysis, and Neural Network Control of an EV Electrical Differential," IEEE Transactions on Industrial Electronics, vol. 55, No. 6 (Jun. 2008): 2286-94, https://www.researchgate.net/publication/3219993.
Lin et al., Tianquan; "Nitrogen-doped mesoporous carbon of extraordinary capacitance for electrochemicalenergy storage," Science (new series), vol. 350, No. 6267 (Dec. 18, 2015): 1508-1513https://www.jstor.org/stable/24741499.
Marie-Francoise et al., Jean-Noel; "Supercapacitor modeling with Artificial Neural Network (ANN)," 2004, https://www.osti.gov/etdeweb/servlets/purl/20823689.
"Micrel™ 2.5V/3.3V 3.0 GHz Dual 2×2 CML Crosspoint Switch w/ Internal Termination, SuperLite™ SY55858U," Nov. 2005, 8 pages, http://ww1.microchip.com/downloads/en/DeviceDoc/sy55858u.pdf.
Surewaard et al., Erik; "A Comparison of Different Methods for Battery and Supercapacitor Modeling," SAE Transactions, Journal of Engines, vol. 112, Section 3 (2003): 1851-1859, https://www.jstor.org/stable/44741399.
"Testing Super-Capacitors, Part 1: CV, EIS, and Leakage Current," Apr. 16, 2015, 11 pages, https://www.gamry.com/assets/Uploads/Super-capacitors-part-1-rev-2.pdf.
"Testing Electrochemical Capacitors Part 2—Cyclic Charge Discharge and Stacsk," Nov. 14, 2011, 11 pages; https://www.gamry.com/assets/Application-Notes/Testing-Super-Capacitors-Pt2.pdf.
"Understanding Tree and Crosspoint Matrix Architectures." Pickering Test, [Downloaded from Internet: Feb. 21, 2023], 7 pages, https://www.pickeringtest.com/en-us/kb/hardware-topics/switching-architectures/understanding-tree-and-crosspoint-matrix-architectures.
PCT Application No. PCT/US2022/052054, International Search Report and Written Opinion dated Feb. 5, 2024.
Kokate et al., "Retrofitting of Auto Rickshaw to E-Rickshaw—A Feasibility Study", 2020 First International Conference on Power, Control and Computing Technologies (ICPC2T), IEEE, URL: https://ieeexplore.ieee.org/stamp/stamp.jsp?tp=&amumber=9071492> entire document.
PCT Application No. PCT/US2022/051881, International Search Report and Written Opinion dated May 26, 2023.
PCT Application No. PCT/US2022/051881, International Preliminary Report on Patentability dated Jun. 13, 2024.
PCT Application No. PCT/US2022/051867, International Preliminary Report on Patentability dated Jun. 13, 2024.
PCT Application No. PCT/US2022/051863, International Preliminary Report on Patentability dated Jun. 13, 2024.
PCT Application No. PCT/US2022/51870, International Preliminary Report on Patentability dated Jun. 13, 2024.
PCT Application No. PCT/US2022/051865, International Preliminary Report on Patentability dated Jun. 13, 2024.
PCT Application No. PCT/US2022/048287, International Preliminary Report on Patentability dated May 10, 2024.
U.S. Appl. No. 18/079,841, Office Action dated Mar. 22, 2024.
U.S. Appl. No. 18/081,508, Office Action dated Apr. 9, 2024.
PCT Application No. PCT/U.S. Pat. No. 2022052033, International Preliminary Report on Patentability dated Jun. 20, 2024.
PCT Application No. PCT/US2022/052034, International Preliminary Report on Patentability dated Jun. 20, 2024.
PCT Application No. PCT/US2022/052045, International Preliminary Report on Patentability dated Jun. 20, 2024.
PCT Application No. PCT/US2022/052054, International Preliminary Report on Patentability dated Jun. 20, 2024.
PCT Application No. PCT/US2022/052035, International Preliminary Report on Patentability dated Jun. 20, 2024.
PCT Application No. PCT/US2022/052036, International Preliminary Report on Patentability dated Jun. 20, 2024.
PCT Application No. PCT/US2022/052049. International Preliminary Report on Patentability dated Jun. 20, 2024.
PCT Application No. PCT/US2022/052602, International Preliminary Report on Patentability dated Jun. 20, 2024.
PCT Application No. PCT/US2022/052890, International Preliminary Report on Patentability dated Jun. 27, 2024.
PCT Application No. PCT/US2022/054386, International Preliminary Report on Patentability dated Jul. 11, 2024.
PCT Application No. PCT/US2022/054226, International Preliminary Report on Patentability dated Jul. 11, 2024.
PCT Application No. PCT/US2022/054334, International Preliminary Report on Patentability dated Jul. 11, 2024.
U.S. Appl. No. 18/075,333, Office Action dated Sep. 25, 2024.
U.S. Appl. No. 18/076,259, Office Action dated Sep. 13, 2024.
Tesla, Model S Owner's Manual, May 16, 2019.
U.S. Appl. No. 18/075,338, Office Action dated Nov. 6, 2024.

* cited by examiner

| CHARGE MANAGEMENT DATABASE 120 | | | | | | | | |
|---|---|---|---|---|---|---|---|---|
| CHARGING CAPACITY (% of electric charge) | CHARGING CAPACITY SERIES/ PARALLEL (Ah) | CHARGING DURATION SERIES/ PARALLEL (minutes) | CHARGE CYCLE (hours) | PHOTO-VOLTAIC CELL PRESET VOLTAGE (V) | PHOTO-VOLTAIC CELL COMPUTED VOLTAGE (V) | PHOTO-VOLTAIC CELL CURRENT (A) | DISCHARG-ING RATE (Ampere/Minute) | CHARGING RATE (Ampere/Minute) |
| 60 | 13/10 | 20/30 | 1.0 | 15 | 8 | 10 | 12 | 10 |
| 70 | 17/14 | 24/32 | 1.2 | 15 | 10 | 12 | 14 | 12 |
| 80 | 19/16 | 29/34 | 1.6 | 15 | 12 | 16 | 10 | 14 |
| 90 | 25/20 | 45/60 | 2.0 | 15 | 14 | 20 | 5 | 20 |

FIG. 2

SYSTEM AND METHOD FOR ENERGY MANAGEMENT OF A POWER PACK FOR AN ELECTRIC VEHICLE INCLUDING PHOTOVOLTAIC CHARGING

CROSS-REFERENCE TO RELATED APPLICATIONS

This application claims the benefit of U.S. Provisional Application No. 63/285,872, filed Dec. 3, 2021, for "SYSTEM AND METHOD FOR ENERGY MANAGEMENT OF A POWER PACK FOR AN ELECTRIC VEHICLE INCLUDING PHOTOVOLTAIC CHARGING," the disclosure of which is incorporated herein by reference in its entirety.

FIELD OF THE DISCLOSURE

The present disclosure is generally related to energy management techniques used in electrical vehicles and particularly relates to a system and method for energy management of a battery pack for an electric vehicle. The present disclosure includes photovoltaic charging on a vehicle to charge super capacitors.

BACKGROUND

The subject matter discussed in the background section should not be assumed to be prior art merely due to its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Growth of electric vehicles (EVs) has evolved exponentially in recent years. To electric passenger cars intended for use on standard vehicle byways, two general classes of vehicle propulsion systems have evolved to pure EVs and hybrid EVs. The pure EVs or vehicles having their propulsion provided only by an electric motor and onboard batteries have a battery management system to supply power to each working component of the vehicle and to maintain the charging and discharging of individual battery units.

Battery packs that are charged can be comprise super capacitors, and super capacitor units in the pack may be charge separately based upon their condition. However, super capacitors can have separate subunits in each unit. The super capacitor sub units can also be separately charged. A cross matrix switch system (not shown) provides and addressing scheme to allow the system to test or to charge any individual subunits on any unit on any battery pack.

Current battery management systems often fail to properly optimize charging for the collection of batteries in the battery packs due to inadequate means for optimizing the charging and discharging of individual batteries or battery packs and can suffer from safety limitations. However, individual battery packs may not be charged to the same level, and the discrepancy between the batteries' state of charge levels can cause individual battery pack capacity or functionality to be limited. Additionally, when some battery units have lower state-of-charge levels, as the battery discharges, those units may discharge to a level resulting in permanent loss of charging capacity. Further, the present battery control systems for rechargeable batteries that have over-charge and under-charge protection features can be overly complex and expensive. Further, the energy consumption of each battery pack with existing battery management system may be particularly inefficient or far from optimized under demanding conditions path of the vehicle is steep or acceleration is highly variable.

Further, the battery management systems that integrate the use of solar cells can face a variety of limitations arising from high costs of inverters and converters, variable current, inefficiency of power harvesting in a grid of solar panels, and the challenges of both providing suitable AC current and charging batteries, etc.

SUMMARY

Disclosed herein are systems and methods for energy management. A system, such as a vehicle, includes power packs and a photovoltaic array with interconnected photovoltaic cells that supplies electric charge to the power packs for charging the power packs. A charge management database stores data tracking respective charge cycles of the power packs based on the charging and discharging of the power packs. An energy control system controls flow of power in the system to control the charging and the discharging of the power packs, optimizes the flow of power in the system based on the respective charge cycles as tracked in the data stored in the charge management database, and updates the charge management database based on the optimization(s). An output interface outputs a status of the power packs based on the flow of power, for instance to indicate effect(s) of the optimization(s) on the power packs.

In an illustrative example, a system is disclosed for energy management. The system comprises: a plurality of power packs that are coupled together; a photovoltaic array that is coupled with the plurality of power packs and that is configured to supply electric charge to the plurality of power packs for charging the plurality of power packs, wherein the photovoltaic array includes a plurality of interconnected photovoltaic cells; a charge management database that is configured to store data tracking respective charge cycles of the plurality of power packs based on the charging of the plurality of power packs and discharging of the plurality of power packs; an energy control system comprising a processor with access to a memory, wherein the energy control system is configured to control flow of power to control the charging of the plurality of power packs and the discharging of the plurality of power packs, wherein the energy control system is configured to optimize the flow of power based on the respective charge cycles of the plurality of power packs as tracked in the data stored in the charge management database, wherein the energy control system is configured to update the charge management database based on optimization of the flow of power; and an output interface coupled to the energy control system and configured to output a status of the plurality of power packs based on the flow of power.

In another illustrative example, a method is disclosed for energy management. The method comprises: controlling, using an energy control system, a flow of power in a system to provide electric charge from a photovoltaic array to a plurality of power packs for charging the plurality of power packs, wherein the photovoltaic array includes a plurality of interconnected photovoltaic cells; controlling, using the energy control system, the flow of power in the system to provide power from the plurality of power packs for discharging the plurality of power packs; storing, in a charge management database, data tracking respective charge cycles of the plurality of power packs based on the charging of the plurality of power packs and discharging of the plurality of power packs; optimizing, using the energy control system, the flow of power in the system based on the respective charge cycles of the plurality of power packs as tracked in the data stored in the charge management database; updating, using the energy control system, the charge management database based on optimization of the flow of power in the system; and outputting, using an output interface, a status of the plurality of power packs based on the flow of power.

BRIEF DESCRIPTION OF THE DRAWINGS

The accompanying drawings illustrate various aspects of systems, methods, and aspects of various other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one. In some examples, an element shown as an internal component of one element may be implemented as an external component in another and vice versa. Furthermore, elements may not be drawn to scale. Non-limiting and non-exhaustive descriptions are described regarding the following drawings. The components in the figures are not necessarily to scale, emphasis instead being placed upon illustrating principles.

FIG. 2 is a table illustrating data stored in a charge management database.

DETAILED DESCRIPTION

Some aspects of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the," include plural references unless the context clearly dictates otherwise. Although any systems and methods similar or equivalent to those described herein can be used in the practice or testing of aspects of the present disclosure, the preferred, systems and methods are now described.

Aspects of the present disclosure will be described more fully hereinafter with reference to the accompanying drawings in which like numerals represent like elements throughout the several figures, and in which example aspects are shown. However, aspects of the claims may be embodied in many different forms and should not be construed as limited to the aspects set forth herein. The examples set forth herein are non-limiting examples and are merely examples among other possible examples.

Method and systems are described for storing trickle charge from alternative energy sources, regenerative sources, or other sources of energy through the use of an storage unit (ESU) comprising power packs with supercapacitors and an energy control system (ECS). A system, such as a vehicle, includes power packs and a photovoltaic array with interconnected photovoltaic cells that supplies electric charge to the power packs for charging the power packs. A charge management database stores data tracking respective charge cycles of the power packs based on the charging and discharging of the power packs. An energy control system controls flow of power in the system to control the charging and the discharging of the power packs, optimizes the flow of power in the system based on the respective charge cycles as tracked in the data stored in the charge management database, and updates the charge management database based on the optimization(s). An output interface outputs a status of the power packs based on the flow of power. The status may be indicative of the optimization(s) and/or effect(s) of the optimization(s) on the charging and the discharging of the power packs, on the flow or power, and/or on the power packs.

Figure 1:
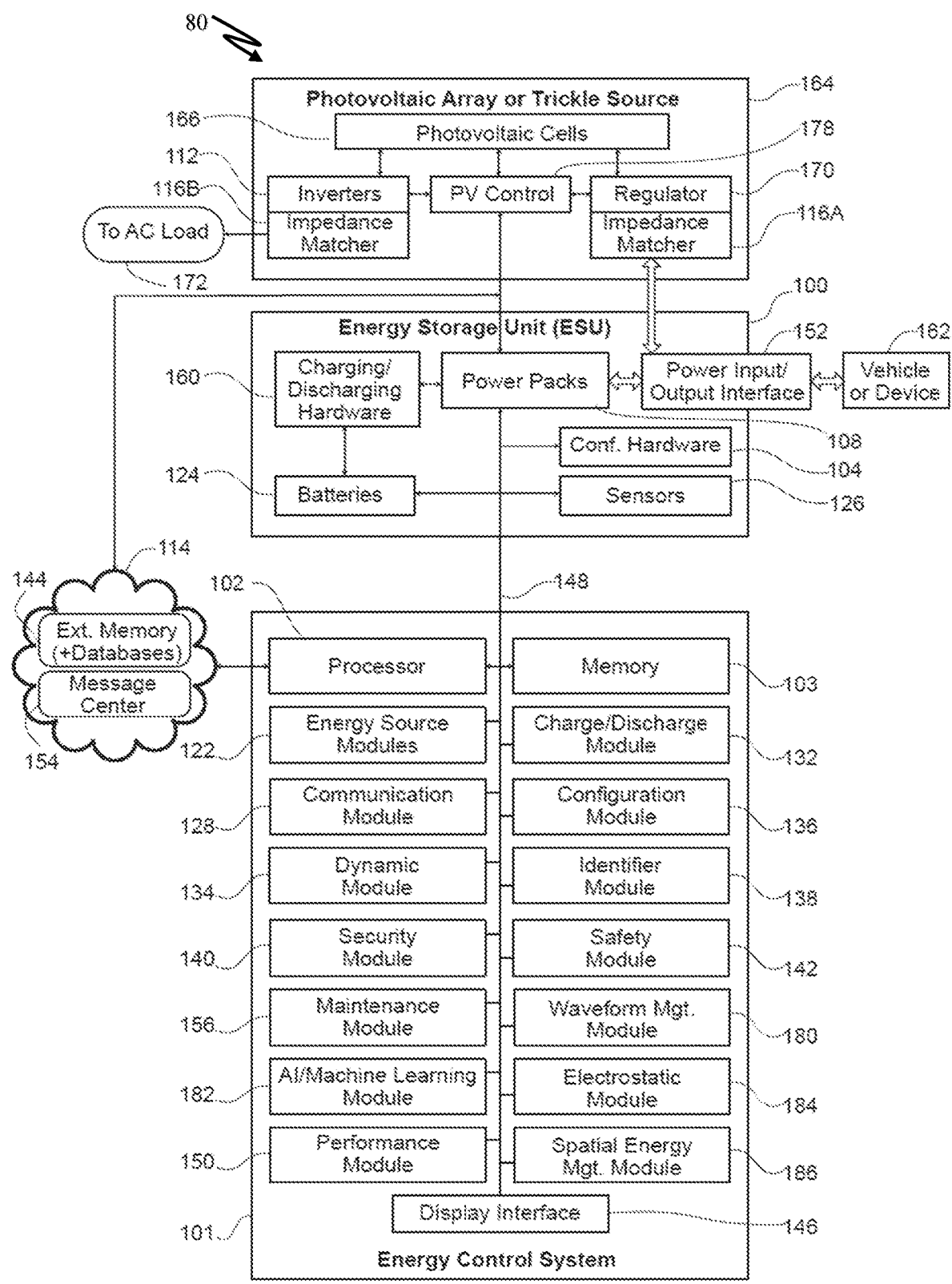
FIG. 1 is a block diagram illustrating a system for energy management of a power pack for an electric vehicle, according to one aspect of the disclosure.

FIG. 1 illustrates a block diagram of an energy management system 80 comprising an energy storage unit (ESU) 100 comprising one or more supercapacitor power packs 108 for use with a vehicle or device 162 (not necessarily part of the energy management system 80). The energy management system 80 comprises an energy control system (ECS) 101 for regulating the ESU 100. FIG. 1 is described in conjunction with FIG. 2-FIG. 9.

Energy Storage Unit (ESU) for Super Capacitors

The ESU 100 is a device that can store and deliver charge. It may comprise one or more power packs which in turn may comprise supercapacitors. The energy storage module may also comprise batteries, hybrid systems, fuel cells, etc. Capacitance provided in the components of the ESU 100 may be in the form of electrostatic capacitance, pseudocapacitance, electrolytic capacitance, electronic double layer capacitance, and electrochemical capacitance, and a combination thereof, such as both electrostatic double-layer capacitance and electrochemical pseudocapacitance, as may occur in supercapacitors. The ESU 100 may be associated with or comprise control hardware and software with suitable sensors 126, as needed, in order for an energy control system (ECS 101) to manage any of the following: temperature control, discharging of the ESU 100 whether collectively or of any of its components, charging of the ESU 100 whether collectively or of any of its individual components, maintenance, interaction with batteries, battery emulation, communication with other devices, including devices that are directly connected, adjacent, or remote such as by wireless communication, etc. In some aspects, the ESU 100 may be portable and provided in a casing that also contains at least some components of the energy control system (ECS 101) as well as features such as communication systems, a display interface, etc.

The term supercapacitor as used herein can also refer to an ultracapacitor, which is an electrical component capable of holding hundreds of times more electrical charge quantity than a standard capacitor. This characteristic makes ultracapacitors useful in devices that require relatively little current and low voltage. In some situations, an ultracapacitor can take the place of a rechargeable low-voltage electrochemical battery. In some examples, the terms supercapacitor or ultracapacitor as used herein can also refer to other types of capacitors.

Energy Control System (ECS 101)

The energy control system (ECS 101) is the combination of hardware and software that manages various aspects of the ESU 100 including the energy delivered by it to the device. The ECS 101 controls and/or regulates the energy storage unit (ESU 100) to control discharging, charging, and other features as desired such as temperature, safety, efficiency, etc. The ESU 100 may be adapted to give the ECS 101 individual control over each power pack or over each supercapacitor or grouped supercapacitor unit in order to efficiently tap the available power of individual supercapacitors and to properly charge individual supercapacitors rather than merely providing a single level of charge for the ESU 100 as a whole that may be too little or too much for individual supercapacitors or their power packs.

The ECS 101 may comprise or be operatively associated with a processor, a memory comprising code for the controller, a database, and communication tools such as a bus or wireless capabilities for interacting with an interface or other elements or otherwise providing information, information requests, or commands. The ECS 101 may interact with individual power packs or supercapacitors through a crosspoint switch or other matrix systems. Further, the ECS 101 may obtain information from individual power packs or their supercapacitors through similar switching mechanisms or direct wiring in which, for example, one or more of a voltage detection circuit, an amperage detection circuit, a temperature sensor, and other sensors 126 or devices may be used to provide details on the level of charge and performance of the individual power pack or supercapacitor.

The ECS may comprise a processor 102, a memory 103, one or more energy source modules 122, a charge/discharge module 132, a communication module 128, a configuration module 136, a dynamic module 134, an identifier module 138, a security module 140, a safety module 142, a maintenance module 156, an artificial intelligence (AI)/machine learning (ML) module 156, a waveform management module 180, an electrostatic module 184, a performance module 150, a special energy module 186, and a display interface 146. The ECS may comprise one or more modules that can be executed or governed by the processor according to code stored in a memory such as a chip, a hard drive, a cloud-based source or other computer readable medium.

The ECS 101 may therefore manage any or all of the following: temperature control, discharging of the ESU 100 whether collectively or of any of its components, charging of the ESU 100 whether collectively or of any of its individual components, maintenance, interaction with batteries or battery emulation, and communication with other devices, including devices that are directly connected, adjacent, or remote such as by wireless communication.

The ECS 101 may comprise one or more energy source modules 122 that govern specific types of energy storage devices such as a supercapacitor module for governing supercapacitors, a lithium module for governing lithium batteries. a lead-acid module for governing lead-acid batteries, and a hybrid module for governing the combined cooperative use of a supercapacitor and a battery. Each of the energy source modules 122 may comprise software encoding algorithms for control such as for discharge or charging or managing individual energy sources, and may comprise or be operationally associated with hardware for redistributing charge among the energy sources to improve efficiency of the ESU 100, for monitoring charge via charge measurement systems such as circuits for determining the charge state of the respective energy sources, etc., and may comprise or be operationally associated with devices for receiving and sending information to and from the ECS 101 or its other modules, etc. The energy source modules 122 may also cooperate with a charging/discharge module 132 responsible for guiding the charging of the overall ESU 100 to ensure a properly balanced charge and a discharge module that guides the efficient discharging of the ESU 100 during use which may also seek to provide proper balance in the discharging of the energy sources.

The ECS 101 may further comprise a dynamic module 134 for managing changing requirements in the power supplied. In some aspects, the dynamic module 134 comprises anticipatory algorithms which seek to predict upcoming changes in power demand and to adjust the state of the ECS 101 in order to be ready to more effectively handle the change. For example, in one case, the ECS 101 may communicate with a GPS and/or terrain map for the route being taken by the electric vehicle and recognize that a steep hill will soon be encountered. The ECS 101 may anticipate the need to increase torque and thus the delivered electrical power from the ESU 100, and thus activate additional power packs 108 if only some are in use or otherwise increase the draw from the power packs 108 in order to handle the change in slope efficiently to achieve desired objectives such as maintaining speed, reducing the need to shift gears on a hill, or reducing the risk of stalling or other problems.

The ECS 101 may also comprise a communication module and an associated configuration system to properly configure the ECS 101 to communicate not only with the interface or other aspects of the vehicle, but also to communicate with central systems or other vehicles, when desired. In such cases, a fleet of vehicles may be effectively monitored and managed to improve energy efficiency and track performance of vehicles and their ESUs 100, thereby providing information that may assist with maintenance protocols, for example. Such communication may occur wirelessly or through the cloud 114 via a network interface, and may share information with various central databases, or access information from databases to assist with the operation of the vehicle and the optimization of the ESU 100, for which historical data may be available in a database.

Databases of use with the ECS 101 include databases on the charge and discharge behavior of the energy sources in the ESU 100 on order to optimize both charging and discharging in use based on previously determined characteristics, databases of topographical and other information for a route to be taken by the electric vehicle or an operation to be performed by another device employing the ESU 100, wherein the database provides guidance on what power demands are to be expected in advance in order to support anticipatory power management wherein the status of energy sources and the available charge is prepared in time to deliver the needed power proactively. Charging databases may also be of use in describing the characteristics of an external power source that will be used to charge the ESU 100. Knowledge of the characteristics of the external charge can be used to prepare for impedance matching or other measures needed to handle a new input source to charge the ESU 100, and with that data the external power can be received with reduced losses and reduced risk of damaging elements in the ESU 100 by overcharge, excessive ripple in the current, etc.

Beyond relying on information in databases, in some aspects the controller is adapted to perform machine learning and to constantly learn from situations faced. In related aspects, the processor and the associated software form a "smart" controller based on machine learning or artificial intelligence adapted to handle a wide range of input and a wide range of operational demands.

The energy storage unit (ESU 100) is governed or controlled by a novel energy control system (ECS 101) adapted to optimize at least one of charging, discharging, temperature management, safety, security, maintenance, and anticipatory power delivery. The ECS 101 may communicate with a user interface such as a display interface to assist in control or monitoring of the ESU 100 and also may comprise a processor and a memory. The ECS 101 may interact with the ESU 100's hardware such as the charging/discharging hardware and a temperature control system which not only provide data to the ECS 101 but are also response to directions from the ECS 101 for the management of the ESU 100.

ESU Hardware
Charging and Discharging Hardware

The charging and discharging hardware 160 comprises the wiring, switches, charge detection circuits, current detection circuits, and other devices for proper control of charge applied to the power packs 108 or to the batteries 124 or other energy storage units as well temperature-control devices such as active cooling equipment and other safety devices. Active cooling devices (not shown) may include fans, circulating heat transfer fluids that pass through tubing or in some cases surround or immerse the power packs 108, thermoelectric cooling such as Peltier effect coolers, etc.

In order to charge and discharge an individual unit among the power packs 108 to optimize the overall efficiency of the ESU 100, the ECS 101 can select one or more of many units from what may be a three-dimensional or two-dimensional array of connector to the individual units. Any suitable methods and devices may be used for such operations, including the use of crosspoint switches or other matrix switching tools. Crosspoint switches and matrix switches are means of selectively connecting specific lines among many possibilities, such as an array of X lines (X1, X2, X3, etc.) and an array of Y lines (Y1, Y2, Y3, etc.) that may respectively have access to the negative or positive electrodes or terminals of the individual units among the power packs 108 as well as the batteries 124 or other energy storage units. SPST (Single-Pole Single-Throw) relays, for example, may be used. By applying charge to individual supercapacitors within powerpacks or to individual power packs 108 within the ESU 100, charge can be applied directly to where it is needed and supercapacitor or power pack can be charged to an optimum level independently of other power packs 108 or supercapacitors.

Configuration Hardware

The configuration hardware 104 comprises the switches, wiring, and other devices to transform the electrical configuration of the power packs 108 between series and parallel configurations, such as that a matrix of power packs 108 may be configured to be in series, in parallel, or in some combination thereof. For example, as 12×6 array of power packs 108 may 4 groups in series, with each group having 3×6 power packs 108 in parallel. The configuration can be modified by a command from the configuration module which then causes the configuration hardware 104 to make the change at an appropriate time (e.g., when the device is not in use).

Sensors

The sensors 126 may include thermocouples, thermistors, or other devices associated with temperature measurement such as IR cameras, etc., as well as strain gauges, pressure gauges, load cells, accelerometers, inclinometers, velocimeters, chemical sensors 126, photoelectric cells, cameras, etc., that can measure the status of the power packs 108 or batteries 124 or other energy storage units, or other characteristics of the ESU 100 or the device as described more fully hereafter. The sensors 126 may comprise sensors 126 physically contained in or on the ESU 100, or also comprise sensors 126 mounted elsewhere such as engine gauges that are in electronic communication with the ESU 100 or its associated ESC.

Batteries and Other Energy Sources

The ESU 100 may be capable of charging, or supplementing the power provided from the batteries 124 or other energy storage units including chemical and nonchemical batteries, such as but not limited to lithium batteries (including those with titanate, cobalt oxide, iron phosphate, iron disulfide, carbon monofluoride, manganese dioxide or oxide, nickel cobalt aluminum oxides, nickel manganese cobalt oxide, etc.), lead-acid batteries, alkaline or rechargeable alkaline batteries, nickel-cadmium batteries, nickel-zinc batteries, nickel-iron batteries, nickel-hydrogen batteries, nickel-metal-hydride batteries, zinc-carbon batteries, mercury cell batteries, silver oxide batteries, sodium-sulfur batteries, redox-flow batteries, supercapacitor batteries, and combinations or hybrids thereof.

Power Input/Output Interface

The ESU 100 also comprises or is associated with a power input/output interface 152 that can receive charge from a device (or a plurality of devices in some cases) such as the grid or from regenerative power sources (e.g., regenerative braking) in a vehicle or device 162 (e.g., an electric vehicle), and can deliver charge to a vehicle or device 162 such as an electric vehicle. The power input/output interface 152 may comprise one or more inverters 112, charge converters, or other circuits and devices to convert the current to the proper type (e.g., AC or DC) and voltage or amperage for either supplying power to or receiving power from the device it is connected to. Bidirectional DC-DC converters may also be applied.

The power input/output interface 152 may be adapted to receive power from a wide range of power sources such as via two-phase or three-phase power, DC power, etc., and may receive or provide power by wires or inductively or any other useful means. Converters, transformers, rectifiers, and the like may be employed by the power input/output interface 152 to do so. The power received may be relatively steady from the grid or other sources at voltages such as 110V, 120V, 220V, 240V, etc., or may be from highly variable sources such as from solar or wind power where amperage or voltage may vary. DC sources may be, by way of example, from 1V to 1000V or higher, such as from 4V to 200V, 5V to 120V, 6V to 100V, 2V to 50V, 3V to 24V, or nominal voltages of about 4, 6, 12, 18, 24, 30, or 48 V. Similar ranges may apply to AC sources, but also including from 60V to 300V, from 90V to 250V, from 100V to 240 V, etc., operating at any useful frequency such as 50 Hz, 60 Hz, 100 Hz, etc.

Power received or delivered may be modulated, converted, smoothed, rectified, or transformed in any useful way to better meet the needs of the application and the requirements of the device and/or the ESU 100. The use of impedance matchers 116A-116B, for example, can help optimize the transfer of power from a photovoltaic array to a DC or AC source (e.g., AC load 172) such as a powered device or the grid. For example, pulse-width modulation (PWM), sometimes called pulse-duration modulation (PDM), may be used to reduce the average power delivered by an electrical signal as it is effectively chopped into discrete parts. Likewise, maximum power point tracking (MPPT) may be employed to keep the load at the right level for the most efficient transfer of power. The power input/output interface 152 may have a plurality of receptacles of receiving power and a plurality of outlets for providing power to one or more devices.

ECS Components and Modules

Processor

The processor 102 may comprise one or more microchips or other systems for executing electronic instructions and can provide instructions to regulate the charging and discharging hardware and, when applicable, the configuration hardware or other aspects of the ESU 100 and/or other aspects of the ECS 101 and its interactions with the vehicle or device 162, the cloud 114, or other systems discussed herein. In some cases, a plurality of processors may collaborate, including processors installed with the ESU 100 and processors installed in a vehicle or device 162.

Memory

The memory 103 may comprise coding for operation of one or more of the ECS 101 modules and their interactions with each other or other components. It may also comprise information such as databases pertaining to any aspect of the operation of the ECS 101, though additional databases are also available via the cloud 114. Such databases can include a charging database that describes the charging and/or discharging characteristics of a plurality or all of the energy sources (the power packs 108 and the batteries 124 or other energy storage units 100), for guiding charging and discharging operations. Such data may also be included with energy-source-specific data provided by or accessed by the energy source modules.

The memory 103 may in one or more locations or components such as a memory chip, a hard drive, a cloud 114-based source or other computer readable medium, and may be in any useful form such as flash memory, EPROM, EEPROM, PROM, MROM, etc., or combinations thereof and in consolidated (centralized) or distributed forms. The memory may in whole or in part be read-only memory (ROM) or random-access memory (RAM), including static RAM (SRAM), dynamic RAM (DRAM), synchronous dynamic RAM (SDRAM), and magneto-resistive RAM (MRAM), etc.

Cloud Resources

The ECS 101 may communicate with other entities via the cloud 114 or other means, and such communication may involve information received from and/or provided to one or more databases and a message center 154. The message center 154 can be used to provide alerts to an administrator responsible for the ESU 100 and/or the vehicle or device 162. For example, an entity may own a fleet of electric vehicles using ESUs 100, and may wish to receive notifications regarding usage, performance, maintenance issues, and so forth. The message center 154 may also participate in authenticating the ESU 100 or verifying its authorization for use in the vehicle or device 162 via interaction with the security module 140.

Energy Source Modules

The energy source modules 122 may comprise specific modules designed for the operation of a specific type of energy source such as supercapacitor module, a lithium battery module, a lead-acid battery module, or other modules. Such modules may be associated with a database of performance characteristics (e.g., charge and discharge curves, safety restrictions regarding overcharge, temperature, etc.) that may provide information for use by the safety module 142 and the charge/discharge module, which is used to optimize the way in which each unit within the power packs 108 or batteries 124 or other energy storage units is used both in terms of charging and delivering charge. The charge/discharge module 132 can optimize power flow by directing power flow to provide useful work from as much of the charge as possible in the individual power packs 108 while ensuring that individual power packs 108 are fully charged but not damaged by overcharging. The charge/discharge module 132 can assist in directing the charging/discharging hardware, cooperating with the energy source modules 122. In one aspect, the ESU 100 thus may provide real-time charging and discharging of the plurality of power packs 108 while the electric vehicle is continuously accelerating and decelerating along a path.

Charge/Discharge Module

The charge/discharge module 132 is used to optimize the way in which each unit within the power packs 108 or batteries 124 or other energy storage units is used both in terms of charging and delivering charge. The charge/discharge module 132 seeks to provide useful work from as much of the charge as possible in the individual power packs 108 while ensuring during charging that individual power packs 108 are fully charged but not damaged by overcharging. The charge/discharge module 132 can assist in directing the charging/discharging hardware 160, cooperating with the energy source modules 122. In one aspect, the ESU 100 thus may provide real-time charging and discharging of the plurality of power packs 108 while the electric vehicle is continuously accelerating and decelerating along a path.

The charge/discharge module 132 may be configured to charge or discharge each of the plurality of power packs 108 up to a threshold limit as part of optimizing power flow. The charge/discharge module 132 may be communicatively coupled to the performance module 150, the energy source modules 122, and the identifier module 138, among others, and may communicate with the charging/discharging hardware 160 of the ESU 100. For example, in one aspect, the threshold limit may be more than 90 percent (or another amount or percentage) of the full capacity of each of the plurality of power packs 108.

Dynamic Module

The dynamic module 134 assists in coping with changes in operation including acceleration, deceleration, stops, changes in slops (uphill or downhill), changes in traction or properties of the road or ground that affect traction and performance, etc., by optimizing the delivery (e.g., discharge) of power or the charging that is taking place for individual power packs 108 or batteries 124 or other energy storage units. In addition to guiding the degree of power provided by or to individual power packs 108 based on current use of the device and the individual state of the power packs 108, in some aspects the dynamic module 134 provides anticipatory management of the ESU 100 by proactively adjusting the charging or discharging states of the power packs 108 such that added power is available as the need arises or slightly in advance (depending on time constants for the ESU 100 and its components, anticipatory changes in status may only be needed for a few seconds (e.g., 5 seconds or less or 2 seconds or less) or perhaps only for 1 second or less such as for 0.5 seconds or less, but longer times of preparatory changes may be needed in other cases, such as from 3 seconds to 10 seconds, to ensure that adequate power is available when needed but that power is not wasted by changing the power delivery state prematurely. This anticipatory control can involve not only increase the current or voltage being delivered, but can also involve increasing the cooling provided by the cooling hardware of the charging and discharging hardware in cooperation with safety module and when suitable with the charge/discharge module.

The dynamic module 134 may be communicatively coupled to the charge/discharge module 132. The dynamic module may be configured to determine the charging and discharging status of the plurality of power packs 108 and batteries 124 or other energy storage units in real-time. For example, in one aspect, the dynamic module 134 may help govern bidirectional charge/discharge in real-time in which the electric charge may flow from the ESU 100 into the plurality of power packs 108 and/or batteries 124 or other energy storage units or vice versa.

Configuration Module

The ECS 101 may comprise a configuration module 136 configured to determine any change in configuration of charged power packs 108 from the charging module. For example, in one aspect, the configuration module 136 may be provided to change the configuration of the power packs 108, such as from series to parallel or vice versa. This may occur via communication with the charging/discharging hardware of the ESU 100.

Identifier Module

The identifier module 138 identifies the charging or discharging requirement for each of the power packs 108 to assist in best meeting the power supply needs of the vehicle or device 162. This process may require access to database information about the individual power packs 108 from the energy source modules (e.g., a supercapacitor module) and information about the current state of the individual power packs 108 provided by the sensors 126 and charge and current detections circuits associated with the charging and discharging hardware 160, cooperating with the charge/discharge module 132 and, as needed, with the dynamic module 134 and the safety module 142.

Safety Module

The sensors 126 may communicate with the safety module 142 to determine if the temperature of the power packs 108 and/or individual components therein show signs of excessive local or system temperature that might lead to harm to the components. In such cases, the safety module 142 interacts with the processor and other features (e.g., data stored in the databases of the cloud 114 or in memory pertaining to safe temperature characteristics for the ESU 100) to cause a change in operation such as decreasing the charging or discharging underway with the portions of the power packs 108 or other units facing excessive temperature. The safety module 142 may also regulate cooling systems that are part of the charging and discharging hardware in order to proactively increase cooling of the power packs 108 or batteries 124 or other energy storage units, such that increasing the load on them does not lead to harmful temperature increase. These types of temperature and/or safety regulation may be part of optimizing flow of power by the ECS 101.

Thus, the safety module 142 may also interact with the dynamic module 134 in responding to forecasts of system demands in the near future for anticipatory control of the ESU 100 for optimized power delivery. In the interaction with the dynamic module 134, the safety module 142 may determine that an upcoming episode of high system demand such as imminent climbing of a hill may imposes excessive demands on a power pack already operating at elevated temperature, and thus make a proactive recommendation to increase cooling on the at-risk power packs 108. Other sensors 126 such as strain gauges, pressure gauges, chemical sensors 126, etc., may be provided to determine if any of the energy storage units in batteries 124 or other energy storage units or the power packs 108 are facing pressure buildup from outgassing, decomposition, corrosion, electrical shorts, unwanted chemical reactions such as an incipient runaway reaction, or other system difficulties. In such cases, the safety module 142 may then initiate precautionary or emergency procedures such as a shut down, electrical isolation of the affected components, warnings to a system administrator via the communication module to the message center, a request for maintenance to the maintenance module 156.

Maintenance Module

The maintenance module 156 determines when the ESU 100 requires maintenance, either per a predetermined scheduled or when needed due to apparent problems in performance, as may be flagged by the performance module 150, or in issues pertaining to safety as determined by the safety module 142 based on data from sensors 126 or the charging/discharging hardware 160, and in light of information from the energy source modules 122. The maintenance module 156 may cooperate with the communication module 128 to provide relevant information to the display interface 146 and/or to the message center 154, where an administrator or owner may initiate maintenance action in response to the message provided. The maintenance module 156 may also initiate mitigating actions to be taken such as cooperating with the charge/discharge module 132 to decrease the demand on one or more of the power packs 108 in need of maintenance, and may also cooperate with the configuration module 136 to reconfigure the power packs 108 to reduce the demand in components that may be malfunctioning of near to malfunctioning to reduce harm and risk. Optimization of power flow can also include such maintenance operations.

Performance Module

The performance module 150 continually monitors the results obtained with individual power packs 108 and the batteries 124 or other energy storage units and stores information as needed in memory and/or in the databases of the cloud 114 or via messages to the message center 154. The monitoring is done through the use of the sensors 126 and the charging/discharging hardware 160, etc. The tracking of performance attributes of the individual energy sources can guide knowledge about the health of the system, the capabilities of the components, etc., which can guide decisions about charging and discharging in cooperation with the charge/discharge module 132. The performance module 150 compares actual performance, such as power density, charge density, time to charge, thermal behavior, etc., to specifications and can then cooperate with the maintenance module to help determine if maintenance or replacement is needed, and alert an administrator via the communication module 128 with a message to the message center 154 about apparent problems in product quality.

Security Module: Security and Anti-Counterfeiting Measures

The security module 140 helps to reduce the risk of counterfeit products or of theft or misuse of legitimate products associated with the ESU 100, and thus can include one or more methods for authenticating the nature of the ESU 100 and/or authorization to use it with the device in question.

In another aspect, the ESU 100 comprises a unique identifier (not shown) that can be tracked, allowing a security system to verify that a given ESU 100 is authorized for use with the device, such as an electric vehicle or other device. For example, the casing of the ESU 100 or of one or more power packs 108 therein may have a unique identifier attached such as an RFID tag with a serial number (an active or passive tag), a holographic tag with unique characteristics equivalent to a serial number or password, nanoparticle markings that convey a unique signal, etc.

Yet another approach relies at least in part in the unique electronic signature of the ESU 100, and/or of one or more individual power packs 108 or of one or more supercapacitor units therein. For instance, when a power pack comprising supercapacitors is charged from a low voltage or relatively discharged state, the electronic response to a given applied voltage depends on many parameters, including microscopic details of the electrode structure such as porosity, pore size distribution, and distribution of coating materials, or details of electrolyte properties, supercapacitor geometry, etc., as well as macroscopic properties such as temperature. At a specified temperature or temperature range and under other suitable macroscopic conditions (e.g., low vibration, etc.), the characteristics of the power pack may then be tested using any suitable tool capable of identifying a signature specific to the individual power pack. Such techniques may include impedance spectroscopy, cyclic voltammetry, etc., measured under conditions such as Cyclic Charge Discharge (CCD), galvanostatic charge/discharge, potentiostatic charge/discharge, and impedance measurements. etc. An electronic signature of time effects (characteristic changes in time of voltage or current, for example, is response to an applied load of some kind) may be explored for a specified scenario such as charging a 90% discharged power pack to a state of 50% charge, or examining the response to difference applied voltages such as −3V to +4V. Voltammograms may be obtained showing, for example, the response of the power pack to different scan rates. Such data about the power packs 108 can be obtained using the sensors 126.

Recognizing that the details of supercapacitor response to a certain load or charge/discharge process may vary gradually over time, especially if the supercapacitor has been exposed to excess voltage or other mechanical or electrical stress, the security module 140 can be adaptive and recognize and accept change within certain limits. Changes observed in the response characteristics can be used to update a security database or performance database for the ESU 100, so that future authentication operations will compare the measured behavior profile of the ESU 100's power pack in question with the updated profile for authentication purposes and for tracking of performance changes over time. Such information may also be shared with the maintenance module 156 including the maintenance database, which may trigger a request or requirement for service if there are indications of damage pointing to the need of repair or replacement. When a power pack or supercapacitor therein is replaced due to damage, the response profile of the power pack can then be updated in the security database. When such physical changes cause changes to the measured electronic characteristics that exceed a reasonable threshold, the authorization for use of that ESU 100 may be withdrawn pending further confirmation of authenticity or necessary maintenance.

Communication Module

The communication module 128 can govern communications between the ECS 101 and the outside world, including communications through the cloud 114, such as making queries and receiving data from various external databases or sending messages to a message center 154 where they may be processed and archived by an administrator, a device owner, the device user, the ESU 100 owner, or automated systems. In some aspects, the communication module 128 may also oversee communication between modules or between the ESU 100 and the ECS 101, and/or work in cooperation with various modules to direct information to and from the display interface. Communications within a vehicle or between the ECS 101 or ESU 100 and the device may involve a DC bus or other means such as separate wiring. Any suitable protocol may be used, including UART, LIN (or DC-LIN), CAN, SPI, I2C (including Intel's SMBus), and DMX (e.g., DMX512). In general, communications from the ECS 101 or ESU 100 with a device may be over a DC bus or, if needed, over an AC/DC bus, or by separately wired pathways if desired, or may be wireless. Useful transceivers for communicating over DC lines include, for example, the SIG family and DCB family of transceivers from Yamar Electronics, LTD (Tel Aviv, Israel), and Yamar's DCAN500 device for CAN2.0 A/B protocol messages.

Communication to the cloud 114 may occur via the communication module 128 and may involve a wired or a wireless connections. If wireless, various communication techniques may be employed such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques.

Electrostatic Module

Assessment of charge in an energy storage unit 100 can be conducted based on measurements made with the charging/discharging hardware 160, in communication with certain modules of the ECS 101. In general, the measurement of charge and processing of the data can be said to be managed by an electrostatic module 184.

The electrostatic module 184 may be configured to identify the power pack type and the capacity of each power pack connected to the modular multi-type power pack energy storage unit. Further, the electrostatic module may be configured to retrieve information related to the type of power packs 108 from the charging database. The electrostatic module 184 may determine the capacity of each power pack to be charged and may be configured to determine the capacity of each power pack when connected to the modular multi-type power pack ESU 100.

The electrostatic module 184 may be configured to determine if each power pack charged below the threshold limit. For example, in one aspect, the electrostatic module may check whether each of the plurality of power packs 108 may have capacity below the threshold limit. The electrostatic module 184 may also be configured to send data related to power packs 108 to the ECS 101. The dada form the electrostatic module 184 may be used for optimizing power flow by the ECS 101.

Various Databases

The ECS 101 may access various databases via an interface to the cloud 114 and store retrieved information in the memory for use to guide the various modules.

Further, the memory may comprise a charging database or information from such a database obtained from the databases of the cloud 114. In one aspect, the charging database may be configured to store information related to various power packs 108 used while charging and discharging from the ESU 100. In one aspect, the charging database may be configured to store information related to the power cycle of each of the plurality of power packs 108, the maximum and minimum charge for different types of power packs 108, and the state of charge (SoC) profile of each of the plurality of power packs 108.

The charging database may be configured to store information related to the management of the plurality of power packs 108 such as the type of power pack to be charged, safety specifications, recent performance data, bidirectional charging requirements or history of each of the plurality of power packs 108, etc. In another aspect, the stored information may also include, but is not limited to, the capacity of each of the plurality of power packs 108, amount of charge required for one trip of the electric vehicle along the path, such as golf course, etc., charging required for a supercapacitor unit, etc. In another aspect, the charging database may provide a detailed research report for the electric vehicle's average electric charge consumption over a path. In one aspect, the charging database may be configured to store information of the consumption of the electric charge per unit per kilometer drive of the electric vehicle from the plurality of power packs 108. For example, such information may indicate that a golf cart is equipped with 5 supercapacitor-driven power packs 108 each at 90% charge, with each power pack able to supply a specified amount of ampere hours (Ah) of electric charge rESU 100 lting in an ability to drive under normal conditions at top speed for, say, 80 kilometers. The information may also indicate that a solar cell installed on the roof of the golf cart would, under current partly cloud 114ed conditions, still provide enough additional charge over the planned period of use to extend the capacity of the ESU 100 by another 40 kilometers for 1 passenger.

The charging database may be used by the performance module for both reading data and storing new data on the individual energy storage units such as the power packs 108.

Power Pack

Each power pack of the power packs 108 is a unit that can store and deliver charge within an energy storage unit, and comprises one or more supercapacitors such as supercapacitors in series and/or parallel. It may further comprise or cooperate with temperature sensors 126, charge and current sensors 126 (circuits or other devices), connectors, switches such as crosspoint switches, safety devices, and control systems such as charge and discharge control systems. In various aspects described herein, the power pack may comprise a plurality of supercapacitors and have an energy density greater than 200 kWhr/kg, 230 kWhr/kg, 260 kWhr/kg, or 300 kWhr/kg—such as from 200 to 500 kWhr/kg, or from 250 to 500 kWhr/kg. The power pack may have a functional temperature range from −70° C. to 150° C., such as from −50° C. to 100° C. or from −40° C. to 80° C. The voltage provided by the power pack may be any practical value such as 3V or greater, such as from 3V to 240 V, 4V to 120 V, etc.

By way of example, a power pack may comprise one or more units each comprising at least one supercapacitor having a nominal voltage from 2 to 12 V such as from 3 to 6 V, including supercapacitors rated at about 3, 3.5, 4, 4.2, 4.5, and 5 V. For example, in an illustrative example of discharge testing, a power pack including 14 capacitors in series and five series in parallel can be charged with 21,000 F at 4.2 V and have 68-75 Wh. Power packs 108 may be packaged in protective casings that allow them to be easily removed from an ESU 100 and replaced. They may also comprise connectors for charging and discharging. Power packs 108 may be provided with generally rectilinear casings or they may have cylindrical or other useful shapes.

Supercapacitor Information

Supercapacitors

A supercapacitor may have two electrode layers separated by an electrode separator wherein each electrode layer is electrically connected to a current collector supported upon an inert substrate layer; further comprising an electrolyte-impervious layer disposed between each electrode layer and each conducting layer to protect the conducting layer; and a liquid electrolyte disposed within the area occupied by the working electrode layers and the electrode separator. The liquid electrolyte may be an ionic liquid electrolyte gelled by a silica gellant or other gellant to inhibit electrolyte flow.

The supercapacitor may comprise an electrode plate, an isolation film, a pole, and a shell, wherein the electrode plate comprises a current collector and a coating is disposed on the current collector. The coating may comprise an active material that may include carbon nanomaterial such as graphene or carbon nanotubes, including nitrogen-doped graphene, a carbon nitride, carbon materials doped with a sulfur compound such as thiophene or poly 3-hexylthiophene etc., or graphene on which is deposited nanoparticles of metal oxide such as manganese dioxide. The coating may further comprise a conductive polymer such as one or more of polyaniline, polythiophene and polypyrrole. Such polymers may be doped with a variety of substances such as boron (especially in the case of polyaniline).

Electrodes in supercapacitors may have thin coatings in electrical communication with a current collector. To provide high electrode surface area for high performance, electrodes may comprise porous material with high specific surface area such as graphene, graphene oxide, or various derivatives of graphene, carbon nanotubes or other carbon nanomaterials including activated carbon, nitrogen doped graphene or other doped graphene, graphite, carbon fiber-cloth, carbide-derived carbon, carbon aerogel, and/or may comprise various metal oxides such as oxides of manganese, etc., and all such materials may be provided in multiple layers and generally planar, cylindrical, or other geometries. Electrolytes in the supercapacitor may include semi-solid or gel electrolytes, conductive polymers or gels thereof, ionic liquids, aqueous electrolytes, and the like. Solid-state supercapacitors may be used.

Supercapacitors may be provided with various indicators and sensors 126 pertaining to charge state, temperature, and other aspects of performance and safety. An actuation mechanism may be integrated to prevent undesired discharge. The voltage of an individual supercapacitor may be greater than 2 V, such as from 2.5 V to 5 V, 2.7 V to 8 V, 2.5 V to 4.5 V, etc.

Powered Devices and Electric Vehicles, Etc.

Powered devices that may be powered by the ESU 100 can include vehicles or devices 162, for instance electric vehicles and other transportation devices of all kinds such as those for land, water, or air, whether adapted to operate without passengers or with one or more passengers. Electric vehicles may include automobiles, trucks, vans, fork lifts, carts such as golf carts or baby carts, motorcycles, electric bikes scooters, autonomous vehicles, mobile robotic devices, hoverboards, monowheels, Segways® and other personal transportation devices, wheelchairs, drones, personal aircraft for one or more passengers and other aeronautical devices, robotic devices, aquatic devices such as boats or personal watercraft such as boats, Jet Skis®, diver propulsion vehicles or underwater scooters, and the like, etc. The electric vehicle generally comprises one or more motors connected to the ESU 100, and an energy control system (ECS 101) that controls the power delivered from the ESU 100, and may comprise a user interface that provides information and/or control regarding the delivery of power from the ESU 100 as well as information regarding performance, remaining charge, safety, maintenance, security, etc. Not all transportation devices require non-stationary motors. An elevator, for example, may have a substantially stationary motor while the cabin moves between level of a structure. Other transport systems with mobile cabins, seats, or walkways may be driven by stationary motors driving cables, chains, gears, bands, etc.

Apart from electric vehicles, there are many other devices that may be powered by the ESU 100 in cooperation with the ECS 101. Such other devices can include generators, which in turn can power other electric devices. ESUs 100 of various size and shape can also be integrated with a variety of motors, portable devices, wearable or implantable sensors, medical devices, acoustic devices such as speakers or noise cancellation devices, satellites, robotics, heating and cooling devices, lighting systems, rechargeable food processing tools and systems of all kinds, personal protection tools such as tasers, lighting and heating systems, power tools, computers, phones, tablets, electric games, etc. In some versions, the device being powered is the grid, and in such versions, the ESU 100 may comprise an inverter to turn DC current into AC current suitable for the grid.

In some aspects, a plurality of devices such as electric vehicles may be networked together via a cloud-based network (e.g., cloud 114), wherein the devices share information among themselves and/or with a central message center such that an administrator can assist in managing the allocation of resources, oversee maintenance, evaluate performance of vehicles and ESUs 100, upgrade software or firmware associated with the ECS 101 to enhance performance for the particular needs of individual users or a collective group, adjust operational settings to better cope with anticipated changes in weather, traffic conditions, etc., or otherwise optimize performance.

Implementation in Hybrid Vehicles

When installed in electric vehicles, the ESU 100 may comprise both power packs 108 as well as one or more lead-acid batteries 124 or other batteries 124. The ESU 100 may power both the motor as well as the on-board power supply system. The display interface 146 of the associated ESC may comprise a graphic user interface such the vehicle's control panel (e.g., a touch panel). The display interface 146 may also comprise audio information and verbal input from a user. The ECS 101 may include another form of output interface additionally or alternatively o the display interface 146, such as an audio output interface that outputs audio (e.g., one or more speakers and/or headphones) and/or a haptic interface that outputs vibrations or other haptic outputs.

Motors

Any kind of electric motor may be power by the ESU 100. Several classes of electric motors that can be used include: 1) DC motors, such as series, shunt, compound wound, separately excited (wherein the connection of stator and rotor is done using a different power supply for each), brushless, and PMDC (permanent magnet DC) motors, 2) AC motors such as synchronous, asynchronous, and induction motors (sometimes also called asynchronous motors), and 3) special purpose motors such as servo, stepper, linear induction, hysteresis, universal (a series-wound electric motor that can operate on AC and DC power), and reluctance motors.

Display Interface

The display interface 146 of the ESC may be displayed on or in the device, such as on a touch screen or other display in a vehicle or device 162, or it may be displayed by a separate device such as the user's phone. The display interface 146 may comprise or be part of a graphic user interface such the vehicle's control panel (e.g., a touch panel). The display interface 146 may also comprise audio information and verbal input from a user. It may also be displayed on the ESU 100 itself or on a surface connected to or in communication with the ESU 100. In some examples, the display interface 146 may include but is not limited to a video monitoring display, a smartphone, a tablet, and the like, each capable of displaying a variety of parameters and interactive controls. The display interface 146 can additionally or alternatively include one or more lights indicating charging or discharging status and optionally one or more digital or analog indicators showing remaining useful lifetime, amount (e.g., percentage) of power remaining, voltage, etc. Further, the display interface 146 may be any type of display means without departing from the scope of the disclosure. In some aspects, the display interface 146 provides graphical information on charge status including one or more of fraction of charge remaining or consumed, remaining useful life of the ESU 100 or its components (e.g., how many miles of driving or hours of use are possible based on current or projected conditions or based on an estimate of the average conditions for the current trip or period of use), and may also provide one or more user controls to allow selection of settings. Such settings may include low, medium, or high values for efficiency, power, etc.; adjustment of operating voltage when feasible; safety settings (e.g., prepare the ESU 100 for shipping, discharge the ESU 100, increase active cooling, only apply low power, etc.); planned conditions for use (e.g., outdoors, high-humidity, in rain, underwater, indoors, etc.). Selections may be made through menus and/or buttons on a visual display, through audio "display" of information responsive to verbal commands, or through text commands or displays transmitted to a phone or computer, including text messages or visual display via an app or web page. Thus, the ESU 100 may comprise a display interface coupled to the processor to continuously display the status of charging and discharging the plurality of power packs 108.

Solar Power and Alternate Energy Systems

Solar panels produce electrical power through the photovoltaic effect, converting sunlight into DC electricity. This DC electricity may be fed to a battery 124 via a solar regulator 170 to ensure proper charging and prevent damage to the battery. While DC devices can be powered directly from the battery 124 or the regulator 170, AC devices use inverter(s) 116A-116B to convert the DC electricity to suitable AC current at, for example, 110V, 120V, 220V, 240V, etc.

Solar panels may be wired in series or in parallel to increase voltage or current, respectively. The rated terminal voltage of, say, a 12 Volt solar panel may actually be around 17 Volts, but the regulator 170 may reduce the voltage to a lower level required for battery charging.

Solar Regulators

Solar regulators 170 (also called charge controllers) regulate current from the solar panels to prevent battery overcharging, reducing or stopping current as needed. They may also include a Low Voltage Disconnect feature to switch off the supply to the load when battery voltage falls below the cut-off voltage and may also prevent the battery sending charge back to the solar panel in the dark.

Regulators 170 may operate with a pulse width modulation (PWM) controller, in which the current is drawn out of the panel at just above the battery voltage, or with a maximum power point tracking (MPPT) controller, in which the current is drawn out of the panel at the panel "maximum power voltage," dropping the current voltage like a conventional step-down DC-DC converter, but adding the "smart" aspect of monitoring of the variable maximum power point of the panel to adjust the input voltage of the DC-DC converter to deliver optimum power.

Inverters

Inverters 112 are devices that converts the DC power to AC electricity. They come in several forms, including on-grid solar inverters 112 that convert the DC power from solar panels into AC power which can be used directly by appliances or be fed into the grid. Off-grid systems and hybrid systems can also provide power to batteries 124 for energy storage, but are more complex and costly that on-grid systems, requiring additional equipment. An inverter/charger that manages both grid connection and the charging or discharging of batteries 124 may be called interactive or multi-mode inverters 112. In some examples, an all-in-one hybrid inverter may be used for at least one of the inverters 112.

Output from inverters 112 may be in the form of a pure sine wave or a modified sine wave or squarewave. Some electronic equipment may be damaged by the less expensive modified sine wave output. In many conventional systems, multiple solar panels are connected to a single inverter in a "string inverter" setup. This can limit system efficiency, for when one solar panel is shaded and has reduced power, the overall current provided to the inverter is likewise reduced. String solar inverters 112 are provided in single-phase and three-phase versions.

Microinverters 112 are miniature forms of inverters 112 that can be installed on the back of individual solar panels, providing the option for AC power to be created directly by the panel. Unfortunately, microinverters limit the efficiency of battery charging, for the AC power from the panels must be converted back to DC power for battery charging. They also add significant cost to the panels. The additional equipment on the panel may also increase maintenance problems and possibly the risk of lightning strikes. Microinverters generally use maximum power point tracking (MPPT) to optimize power harvesting from the panel or module it is connected to.

The on-grid string solar inverters and microinverters can be referred to as solar inverters 112, and can provide AC power that can be fed to the grid or directly to a home or office. Alternatively, off-grid inverters 112 (or "battery inverters 112") or hybrid inverters 112 can charge batteries 124. Hybrid inverters 112 can be used to charge batteries 124 with DC current and to provide AC current for the grid or local devices, combining a solar inverter and battery inverter/charger into a single unit.

Solar power systems may employ "deep cycle solar batteries 124," which are designed for discharge over a long period of time (e.g., several days). Such batteries 124 may be at risk of permanent damage is highly discharged, such as below 30% of capacity. They also may suffer the drawback of being able to deliver less total charge at a high load than at a low load due to problems of overheating at elevated discharge rates.

Machine Learning and AI

The ECS 101 or central systems in communication with the ECS 101 may employ machine learning, including neural networks and AI systems, to learn performance profiles for individual powerpacks, supercapacitors, or entire ESUs 100, or those of a managed fleet of vehicles of collection of devices, in order to better estimate and optimize performance including such factors as remaining charge, remaining useful life, times for maintenance, methods for charge control to reduce overheating or to prevent other excursions or safety issues, and strategies to optimize lifetime or power delivery with a given ECS 101.

Energy Management System

In some examples, the energy management system 80 may be referred to as a system for charging a graphene supercapacitor power pack using photovoltaics to offset load and provide a trickle charge. Further, the energy management system 80 may provide smart energy management to supply electric charge to the powered device from the power pack in a controlled manner, in order to maximize the efficiency of charge.

The vehicle or device 162 may include electric vehicles and other transportation devices of all kinds such as those for land, water, or air, whether adapted to operate without passengers or with one or more passengers. Examples of vehicles are listed above. Other powered devices that may be powered by the ESU 100 in cooperation with a trickle charge source such as solar panels or wind power, wave power, regenerative power from vehicles, various forms of inductive power, power driven by the motion of humans, etc. Such other devices can include generators, a wide variety of motors, portable devices, wearable or implantable sensors, medical devices, acoustic devices such as speakers or noise cancellation devices, satellites, robotics, heating and cooling devices, lighting systems, rechargeable food processing tools and systems of all kinds, personal protection tools such as tasers, lighting and heating systems, power tools, computers, phones, tablets, electric games, etc. In some versions, the device being powered is the grid, and in such versions, the ESU 100 may comprise an inverter (not shown) to turn DC current into AC current suitable for the grid, which may be integral with or operatively associated with the power input/output interface 152.

Further, the energy management system 80 may comprise a processor 102 coupled to a display interface 146. Further, the processor 102 may be coupled with a photovoltaic array 164, via a bus or communication pathway 148 which may comprise or function as a network interface among multiple components. The photovoltaic array 164 comprises a plurality of PV cells 166 such as solar panels, one or more inverters 112 or microinverters, and a PV control system 178 that may include or cooperate with a regulator 170 (in some aspects there may be more than one regulator 170), with impedance matchers 116A, 116B, and with input from the ECS 101.

Further, the energy management system 80 may provide smart energy management to supply electric charge to vehicle motor from the power packs 108 in a controlled manner, to maximize the efficiency of charge. Further, the energy management system 80 may also provide a real-time charging and/or discharging of the power packs 108 while the electric vehicle may be continuously accelerating and decelerating along a path. In one aspect, the energy management system 80 may be referred as a modular graphene power pack for powering the electric vehicle or device 162. In one aspect, the energy management system 80 may be capable of charging chemical and nonchemical batteries, such as but not limited to, lithium batteries, lead-acid batteries, supercapacitor batteries, etc.

Further, the display interface 146 may be configured to display the charge level of the power packs 108. In one aspect, the display interface 146 may be configured to display the charging rate or discharging rate of the power packs 108. In another aspect, the display interface 146 may be configured to display the charge level of the photovoltaic array 164 and information related to the charge level required for the power packs 108. The processor 102 may be configured to control the operation of charging and discharging of the power packs 108 which consists of the supercapacitors. Batteries 124 consists of electrochemical batteries that may be used in conjunction with power packs 108. In one aspect, the energy management system 80 may be configured to determine the charge level required by the power packs 108 of the electric vehicle (not shown) and therefore to charge the battery pack of the electric vehicle according to the level of charge required. In one aspect, the energy management system 80 is configured to manage the energy of the battery pack of the electric vehicle. In one aspect, the display interface 146 may be integrated within the electric vehicle to display charging and discharging of the power packs 108. In one aspect, the display interface 146 may include, but is not limited to, a video monitoring display, a smartphone, a tablet, and alike.

In one aspect, the photovoltaic array 164 may comprise photovoltaic cells 166 and/or other photovoltaic (PV) modules coupled together. In one aspect, each photovoltaic module may comprise the plurality of photovoltaic cells 166 interconnected together. Further, photovoltaic array 164 may be coupled with inverters 112 such as microinverters to deliver AC current from the photovoltaic array 164 to an AC load 172. DC current may be directly provided by the regulator 170 with assistance of a its impedance matcher 116A to provide current to the power pack 108 via the ESU's power input/output interface 152 or by direct connection to the power packs 108 (not shown) with the assistance of the charging/discharging hardware 160, as needed.

The power input/output interface 152 receives power from the photovoltaic array 164 and then cooperates with the charging and discharging hardware 160 as directed by the charge/discharge module 132 to ensure management of the charging rate of the plurality of the power packs 108 and batteries 124 with respect to the electric charge generated by the photovoltaic array 164. Further, the photovoltaic array 164 may be provided with a first impedance matcher 116A which may be configured to facilitate match of an impedance of the photovoltaic array 164 with the power packs 108 of the electric vehicle or device 162.

It should be noted that memory unit 103 can be used to store all databases and all modules that execute in this system. The processor 102 gets its instructions from the memory unit 103 as is standard in all processor and memories communications, over an address and databus.

The flow of charge from the photovoltaic array 164 to the power packs 108 may be managed by the charge/discharge module 132 as it interacts with the power input/output interface 152 and the charging/discharging hardware 160, in cooperation with the PV control system 176 and the regulator 170 of the photovoltaic array 164.

Further, the energy management system 80 may comprise or provide access to memory 103 and/or external memory 144 comprising one or more databases, wherein external memory 144 may be accessed via the cloud 114. The external memory 144 may be communicatively coupled to the processor 102 via wireless or wired connections, including at least in part communication via the bus or communication pathway 148. Further, the memory 103 and/or the external memory 144 may be configured to receive a set of instructions from the processor 102 while charging and discharging the power packs 108. In one aspect, the set of instructions may facilitate activation of a charging mode and/or a discharging mode to charge and/or discharge the power packs 108. It can be noted that the bus or communication pathway 148 may facilitate a communication link among the components of the energy management system 80. Communication may also be assisted by the communication module 136, using any of the communications techniques previously discussed.

Further, the external memory 144 or memory 103 memory may comprise a charge management database 120 is described in FIG. 2. In one aspect, the charge management database 120 may be configured to store information related to the power packs 108 used while charging and discharging from the system 80. In one aspect, the charge management database 120 may be configured to store information related to a charge cycle of each of the power packs 108 or individual supercapacitors therein, the maximum and minimum charge for a different type of the power packs 108, and state of charge (SoC) profile of each of the power packs 108 or of the individual supercapacitors therein.

Further, the charge management database 120 may be configured to store information related to the management of the power packs 108. In one aspect, the stored information may also include, but is not limited to, the capacity of each of the power packs 108, amount of charge required for one trip of the electric vehicle along the path, such as golf course, etc., charging required for each power pack, and acceleration and deceleration data related to the path of the electric vehicle. In one aspect, the charge management database 120 may provide a detailed research report for an average electric charge consumption of the electric vehicle over a path. In another aspect, the charge management database 120 may be configured to store information of the consumption of the electric charge per unit per kilometer drive of the electric vehicle from the power packs 108. For example, a golf cart may be installed with 10 supercapacitor units coupled in series, each supercapacitor unit will supply 13 Ampere Hour (Ah) of the electric charge for one hour to drive the golf cart for a distance of one kilometer with a characteristic average velocity of 3.5 m/s.

Further, the energy management system 80 may comprise a plurality of modules to evaluate and enhance the performance of charging and discharging the capacity of the power packs 108. In one aspect, the plurality of modules may enhance the performance of the electric vehicle by supplying the electric charge from the power packs 108 according to the desired need of the electric vehicle.

The ECS 101 or modules therein may be configured to manage parameters related to photovoltaic array 164 and the power packs 108, such as but not limited to, the electric charge generated by the photovoltaic array 106, the electric charge of the power packs 108, and the performance of the power packs 108 when installed in the electric vehicle. Further, the ECS 101 may be described in FIGS. 3A and 3B. In one aspect, the ECS 101 may act as a central module to receive and send instructions to each of the plurality of modules. In one aspect, the ECS 101 may be configured to activate and/or deactivate a plurality of sub-modules according to the information received from the processor 102 and the memory 103 and/or external memory 144. Further, the ECS 101 may comprise one or more modules, such as the electrostatic module 184 to measure the electrical state of the power packs, the charge/discharge module 132, and the performance module 150 that together or alone may obtain data related to the flow of energy from the photovoltaic array 164 to the power packs 108 in real-time. In one aspect, the ECS 101 may be configured to determine the percentage of electric charge available in each of the power packs 108, as described in FIG. 4.

Further, the ECS 101 may comprise an Artificial Intelligence/Machine Learning (AI/ML) module 182 to evaluate and receive data related to the photovoltaic array 164 according to the percentage of electric charge available in each of the power packs 108 determined by the charge/discharge module 132. In some examples, the AI/ML module 182 may include a ML engine 1020 that trains and/or uses one or more ML models 1025 as discussed with respect to FIG. 10. In one aspect, the ECS 101 may be configured to receive an input request from the charge/discharge module 132 related to the requirement of the electric charge of the supercapacitor power packs 108 and to the batteries 124, which, in one aspect may be determined by the electrostatic module 184 in light of information provided from the energy sources modules 122, particularly from a supercapacitor module therein (not shown), and/or from the charge management database 120 (which may be integral with or share resources and data with the energy sources modules 122).

In some aspects, the supercapacitors in the power pack 108 can be quickly charged (when the sun is out) and the batteries will not be charged until the supercapacitors in the power pack 108 are charged. It should be noted that this charge/discharge module 132 manages how much charge and the rate of charge and the timing of the charge is managed between the PV array 164 and/or trickle source. For instance, batteries 124 usually require lower current over longer periods of time, whereas the supercapacitors in power pack 108 may require a higher current for a shorter amount of time. So the charge/discharge module 132 manages the charge amount and the charge time to each of the batteries 124 and supercapacitor power packs 108. Also the charge/discharge module 132 manages the charge amount and the charge time to each of the batteries 124 and supercapacitor power packs 108 based upon what is available from the PV array 164 and/or trickle source. Also the charge/discharge module 132 manages the charge amount and the charge time to each of the batteries 124 and supercapacitor power packs 108, where in some cases, when there is no sun and no power coming from the PV array 164 and/or trickle source, the supercapacitors in the power pack 108 may be used to charge the batteries 124, allowing the lower current and longer charge times to be done at a time when the supercapacitor powerpacks 108 are not needed or can be scheduled for a rapid charge when the sun comes out.

In one aspect, the AI/ML module 182 may be activated and deactivated automatically by the ECS 101 according to the input request from the charge/discharge module 132. In one aspect, the AI/ML module 182 may be configured to retrieve data related to each of the power packs 108 from the charge management database 120. In one aspect, the data related to each of the power packs 108 may be the amount of charge stored in each of the power packs 108. In another aspect, the AI/ML module 182 may be configured to process various inputs such as measurements from the electrostatic module 184 and/or from the charging/discharging hardware 160 to accurately estimate the charge remaining and remaining useful lifetime of the power packs 108, in light of information from the charge management database 120 and other databases. Further, the AI/ML module 182 may determine whether charging is needed or not or whether maintenance is needed or other adjustments are needed. The AI/ML module 182 is described in FIG. 5.

The AI/ML module 182 may employ machine learning, including neural networks and AI systems, to learn performance profiles for individual powerpacks, supercapacitors, or entire ESUs, or those of a managed fleet of vehicles of collection of devices, in order to better estimate and optimize performance including such factors as remaining charge, remaining useful life, times for maintenance, methods for charge control to reduce overheating or to prevent other excursions or safety issues, and strategies to optimize lifetime or power delivery with a given ECS]

Further, the ECS 101 may comprise an electrostatic module 184 to evaluate and determine the charge level of each of the power packs 108 according to the percentage of electric charge available in each of the power packs 108 determined by the charge/discharge module 132. Further, the electrostatic module 184 may be configured to charge and/or discharge the power packs 108. In one aspect, the electrostatic module 184 may analyze the charge level of each of the power packs 108 and determine the charging rate or discharging rate of the power packs 108. In one aspect, the electrostatic module 184 may analyze the charge level of each of the power packs 108 super capacitors units and sub units. The electrostatic module 184 is described in FIG. 6.

Further, the ECS 101 may comprise a waveform management module 180 to evaluate change in waveform of the charge level and the energy level (by time) of each of the plurality of supercapacitor packs 108. The waveform management module 180 is further configured to detect a change in the waveform of the charging rate or discharging rate of each of the plurality of supercapacitor packs 108. Detecting the change in waveform may be accomplished by performing convolution correlations of prestored waveforms and their meta data (data related to performance, rules or actions based upon a matched waveform) to real times waveforms measured.

Further, the waveform management module 180 may use an AI/ML algorithm to perform detection, monitoring, anticipation, and response to various charging parameters. In one aspect, the charging parameters may be current, voltage, inductance, and other power transfer parameters. The waveform management module 180 is described in FIG. 7. In some respects, the waveform management module 180 may also or alternatively survey and act on the incoming power to the power packs 108 during charging to reduce potential harm from noisy signals.

Further, the ECS 101 may comprise a spatial energy management module 186 to evaluate and charge the power packs 108 (super capacitors battery units and their related sub units). In one aspect, the spatial energy management module 186 may be configured to detect and manage data related to a spatial energy change of the photovoltaic array 164. In one aspect, the data related to the spatial energy change may be a change in the flow of energy from the photovoltaic array 164 to the power packs 108. Further, the spatial energy management module 186 may be configured to determine the flow of energy from the photovoltaic array 164 to the power packs 108 in real-time. In one aspect, the spatial energy management module 186 may be configured to retrieve information related to predefined charging parameters of the photovoltaic array 164 from the charge management database 120. In one aspect, the predefined charging parameters may be a preset voltage of the photovoltaic cells 166 of the photovoltaic array 164. Further, the spatial energy management module 186 is configured to detect spatial energy change due to the difference in voltages between the photovoltaic cells 166 of the photovoltaic array 164. In one aspect, the spatial energy management module 186 may retrieve information from the charge management database 120 to evaluate the spatial energy change in the photovoltaic array 164 when connected for charging and/or discharging to the power packs 108 of the system 80. The spatial energy management module 186 is described in FIG. 8.

Further, the ECS 101 may comprise a communication module 128 communicatively coupled to the charge/discharge module 132, the AI/ML module 182, the electrostatic module 184, the waveform management module 180, and the spatial energy management module 186. Further, the communication module 128 may be configured to enable the transfer of charge from the photovoltaic array 164 to each of the power packs 108. The communication module 128 may guide communication with external systems such as with the cloud 114 or with the photovoltaic array 164, as well as communication between modules or other components, and communication with the display interface 146 and/or the vehicle or device 162 itself. It may be also configured to direct, in cooperation with other modules, the transfer of energy to each of the power packs 108 up to a threshold limit. In one aspect, the threshold limit may be more than 90 percent capacity of each of the power packs 108. The communication module 128 is described in FIG. 9.

FIG. 2 is a table illustrating data stored in the charge management database 120 according to an aspect of the present disclosure. As shown in FIG. 2, the charge management database 120 may be configured to store information related to a variety of power packs used while charging and discharging from the system 80. In one aspect, the charge management database 120 stores information of different varieties of power packs such as but not limited to supercapacitor units, lead-acid cells or batteries, lithium batteries, or other types of chemical and non-chemical power packs. Further, the charge management database 120 may be configured to store information related to the power cycle of each of the power packs 108, the maximum and minimum charge for a different type of the power packs 108, and state of charge (SoC) profile of each of the power packs 108. For example, a supercapacitor unit coupled to a golf cart has a charge cycle of 1 hour with a charging capacity of 60 percent storing 13 Ah of the electric charge, and the supercapacitor unit when charged to 60 percent of its capacity delivers the electric charge for 15 minutes.

In one aspect, the charge management database 120 may be configured to store the charging capacity of each of the power packs 108 when connected in series and/or parallel. In another aspect, the charge management database 120 may also store the charging duration of each of the power packs 108 when connected in series and/or parallel. In one example, if 10 supercapacitor units are connected in series, and each supercapacitor power pack receives 13 Ah of the electric charge to reach 60 percent of their capacity for 20 minutes, then each of the 10 supercapacitor units delivers the charge cycle of 1 hour. Similarly, if the 10 supercapacitor units are connected in parallel and each supercapacitor power pack receives 10 Ah of the electric charge to reach 60 percent of their capacity for 30 minutes, then each supercapacitor power pack can deliver the same charge cycle of 1 hour. In another example, if the 10 supercapacitor units are connected in series and/or parallel, then each supercapacitor power pack receives 17 Ah to reach 70 percent of its capacity for 24 minutes in series connection and 14 Ah to reach the 70 percent of its capacity for 32 minutes in parallel connection, to deliver the charge cycle of 1.2 hours. Similarly, in the case of the 10 supercapacitor units connected in series and/or parallel and charged 80 percent of their capacity, each supercapacitor power pack receives 19 Ah of the electric charge within 29 minutes in series connection, and each supercapacitor power pack receives 16 Ah of the electric charge within 34 minutes in parallel connection, and each supercapacitor power pack delivers 1.6 hours of the charge cycle.

Further, as shown in FIG. 2, the charge management database 120 may be configured to store the charging capacity of the photovoltaic array 164. In another aspect, the charge management database 120 may also store the preset voltage of the photovoltaic cells 166. In one example, if the value of the preset voltage of the photovoltaic cell is 15 V, and the computed voltage while charging the cell is 8V corresponding to a current of 10 A through the photovoltaic cell, then the charge capacity of the photovoltaic cells 166 is 60 percent of charge capacity of the photovoltaic array 164 and charge cycle from the photovoltaic cells 166 is 1 hour. In another example, if the value of the preset voltage of the photovoltaic cell is 15 V, and the computed voltage while charging the cell is 10V corresponding to a current of 12 A through the photovoltaic cell, then the charge capacity of the photovoltaic cells 166 is 65 percent of charge capacity of the photovoltaic array 164 and charge cycle from the photovoltaic cells 166 is 1.2 hours. In yet another example, if the value of the preset voltage of the photovoltaic cell is 15 V, and the computed voltage is 12V corresponding to a current of 16 A through the photovoltaic cell, then the charge capacity of the photovoltaic cells 166 is 75 percent of charge capacity of the photovoltaic array 164 and charge cycle from the photovoltaic cells 166 is 1.6 hours. Similarly, in another example, if the value of the preset voltage of the photovoltaic cell is 15 V, and the computed voltage is 14V corresponding to a current of 20 A through the photovoltaic cell, then the charge capacity of the photovoltaic cells 166 is 85 percent of charge capacity of the photovoltaic array 164 and charge cycle from the photovoltaic cells 166 is 2 hours. This charge capacity and the duration of charge of the photovoltaic cells 166 is then compared with the threshold value and the AI/ML module 182 determines the amount of charge be transferred from the photovoltaic array 164 to the supercapacitor power packs 108.

The charge management database 120 may be, and/or may include, various types of databases, such as a Distribution Database, a Relational Database, an Object Oriented Database, a Cloud Database, a Centralized Database, an End User Database, a NoSQL Database, a Commercial Database, a Personal Database, or an Operational Database.

Figure 3A:
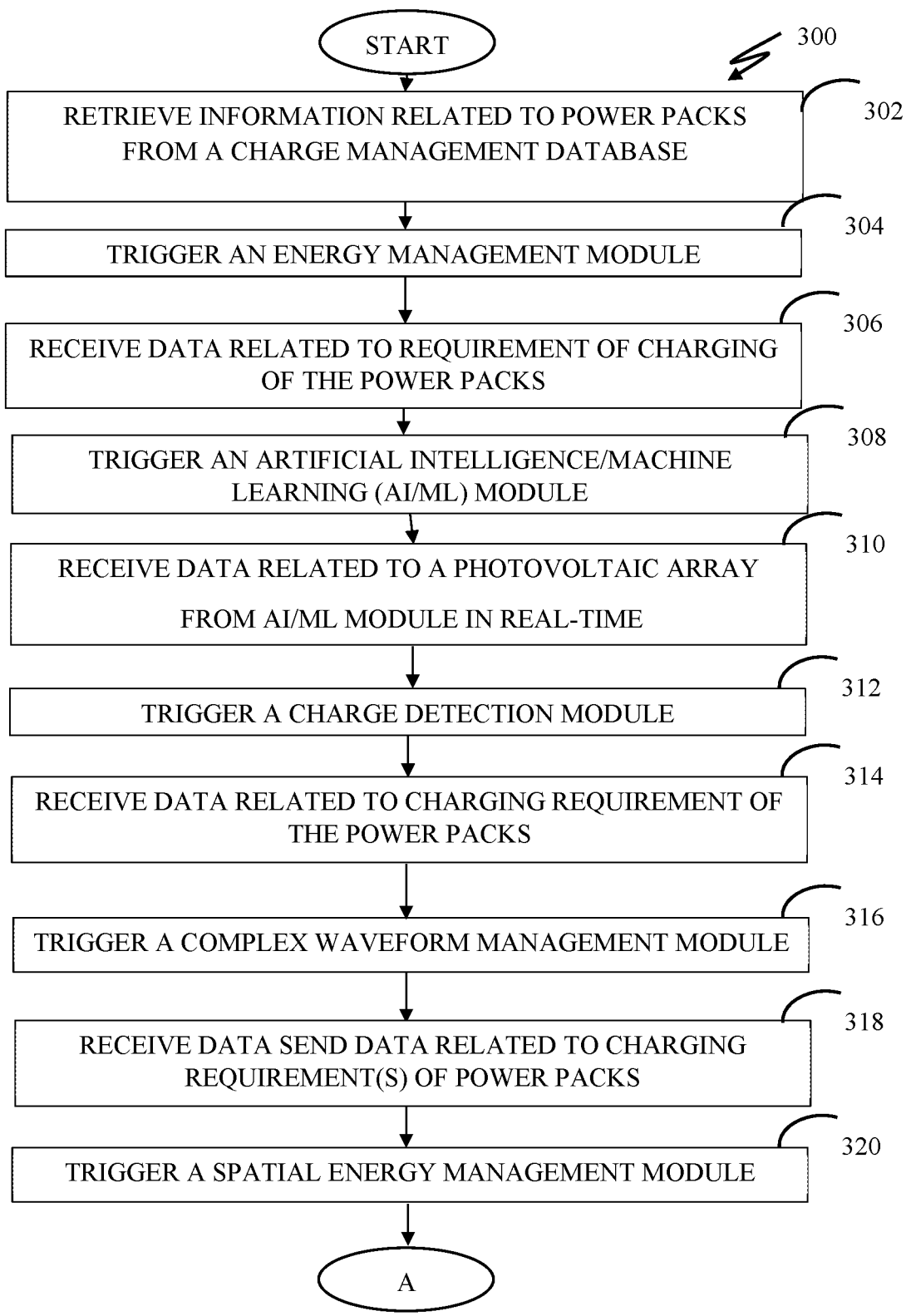
FIG. 3A is a flow diagram illustrating a first portion of a process for energy management performed by a base module.
Figure 3B:
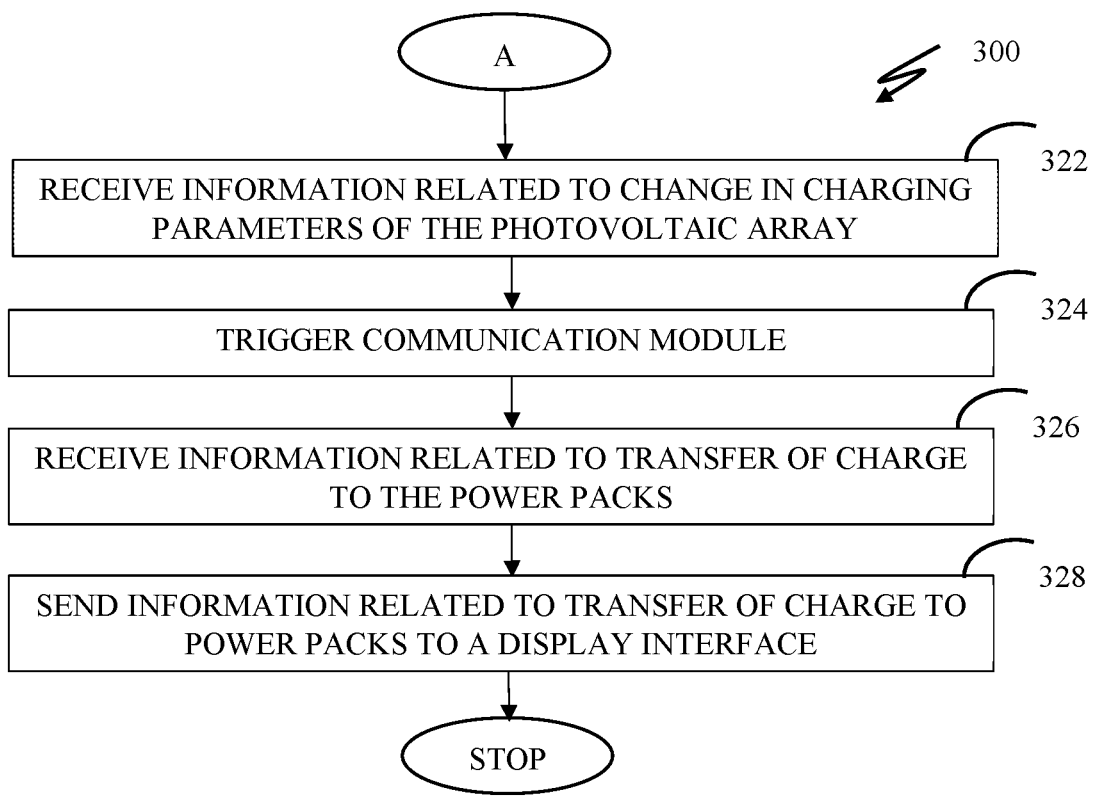
FIG. 3B is a flow diagram illustrating a second portion of a process for energy management performed by a base module.

FIGS. 3A and 3B illustrate a flowchart showing a process 300 performed by the ECS 101, according to an aspect. In particular, FIG. 3A is a flow diagram illustrating a first portion of a process 300 for energy management performed by a base module. FIG. 3B is a flow diagram illustrating a second portion of a process 300 for energy management performed by a base module. FIGS. 3A and 3B are described in conjunction with FIG. 1, FIG. 2, FIG. 4, FIG. 5, FIG. 6, FIG. 7, FIG. 8, and FIG. 9. In one aspect, the ECS 101 may be configured to initiate each of the plurality of modules to enhance the performance and the capability of the supercapacitor power packs 108. It should also be noted that in some alternative implementations, the functions noted in the blocks may occur out of the order noted in the drawings. For example, two blocks are shown in succession in FIGS. 3A and 3B may be executed substantially concurrently or the blocks may sometimes be executed in the reverse order, depending upon the functionality involved. In addition, the process descriptions or blocks in flow charts should be understood as representing decisions made by a hardware structure such as a state machine.

At first, the ECS 101 may be configured to retrieve information related to the power packs 108 from the charge management database 120, at operation 302. In one aspect, the information related to each of the power packs 108 may be the type of power packs connected to the system 80, duty cycle, or charge cycle of each supercapacitor power pack, the capacity of each supercapacitor power pack to store the electric charge. For example, the ECS 101 retrieves information from the charge management database 120 that the power pack connected for charging is a supercapacitor power pack coupled to a golf cart, and the charge management database 120 states that the charge cycle of the supercapacitor power pack is 08 for 4 hours, and the supercapacitor power pack, when charged to its maximum capacity, delivers the electric charge for 30 minutes. Further, the ECS 101 may trigger an energy management module such as the charge/discharge module 132, at operation 304.

Figure 4:
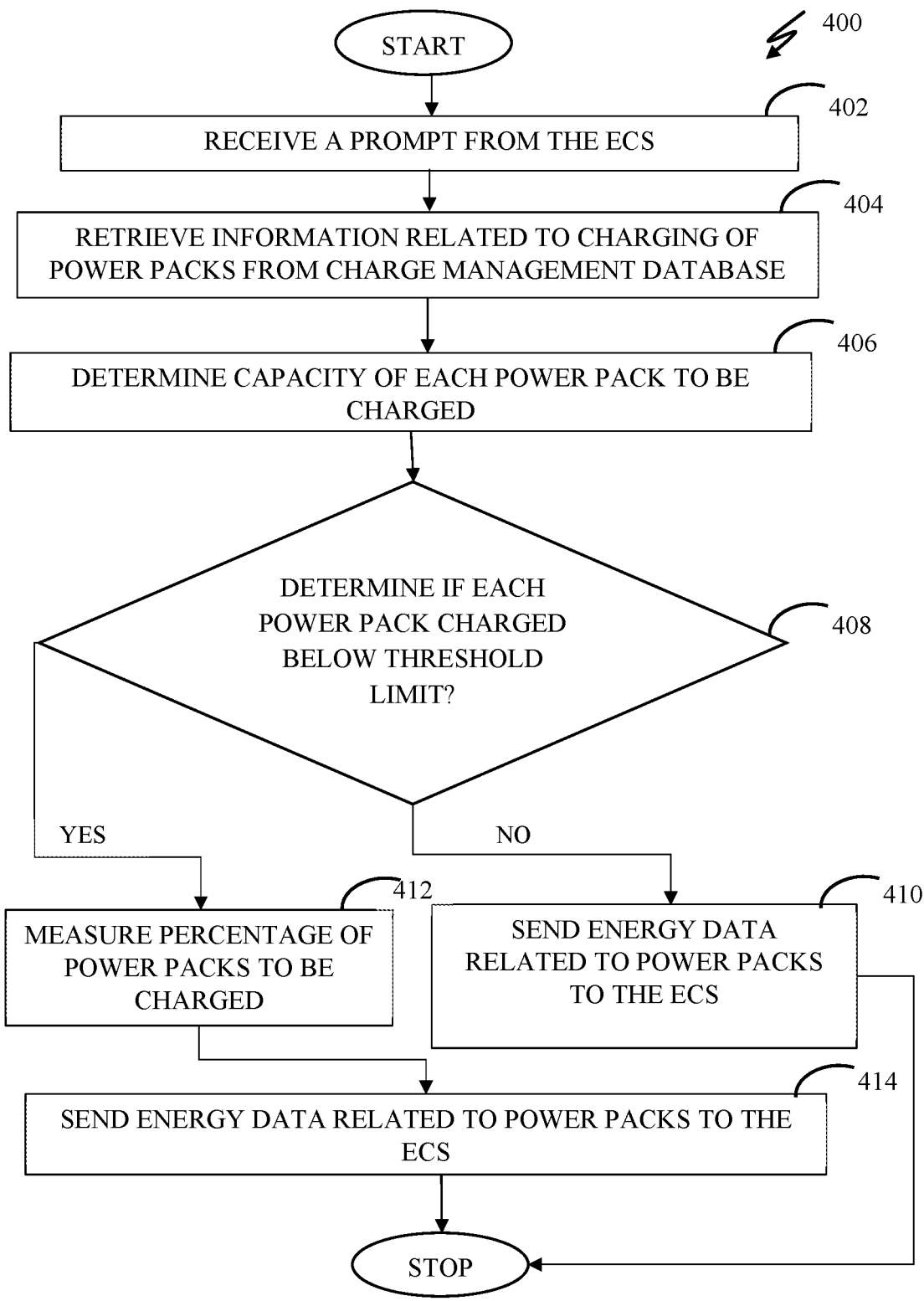
FIG. 4 is a flow diagram illustrating a process for energy management performed by an energy management module.

Further, the charge/discharge module 132 is described in FIG. 4. FIG. 4 illustrates a flowchart of a process 400 performed by the charge/discharge module 132. It should also be noted that in some alternative implementations, the functions noted in the blocks may occur out of the order noted in the drawings. For example, two blocks shown in succession in FIG. 4 may be executed substantially concurrently or the blocks may sometimes be executed in the reverse order, depending upon the functionality involved. In addition, the process descriptions or blocks in flow charts should be understood as representing decisions made by a hardware structure such as a state machine.

At first, the charge/discharge module 132 may receive a prompt from the ECS 101, at operation 402. In some aspects, the charge/discharge module 132 may be configured to identify the type of power pack and the capacity of each power pack connected to the system 80. Further, the charge/discharge module 132 may be configured to retrieve information related to charging of the power packs 108 from the charge management database 120, at operation 404. For example, the charge/discharge module 132 retrieves information from the charge management database 120 that the power packs 108 connected to the energy management system 80 are 10 supercapacitor units and these 10 supercapacitor units are connected in series. Successively, the charge/discharge module 132 may determine the capacity of each of the power packs 108 to be charged, at operation 406. In one aspect, the energy source module 122 may be configured to determine the capacity of each power pack when connected to the system 80. For example, the charge/discharge module 132 determines that each of the 10 supercapacitor units connected in series can store 20 Ah of the electric charge.

Further, the charge/discharge module 132 may be configured to determine, if each power pack charged below the threshold limit, at operation 408. In one aspect, the charge/discharge module 132 may check whether each of the power packs 108 may have the capacity below the threshold limit. In one case, the charge/discharge module 132 determines when the supercapacitor units are not charged below the threshold limit, then the charge/discharge module 132 may proceed further to operation 410, to send data related to supercapacitor units to the ECS 101. For example, the charge/discharge module 132 determines that when the 10 supercapacitor units are charged up to the threshold limit of 90 percent of the electric charge, do not need to be charged. In another case, the charge/discharge module 132 determines that when the supercapacitor units are charged below the threshold limit, the charge/discharge module 132 may proceed further to operation 412, to measure the percentage of supercapacitor power packs 108 to be charged. For example, the charge/discharge module 132 determines that the 5 supercapacitor units which are charged up to 60 percent of the capacity need to be charged.

Further, the charge/discharge module 132 may be configured to measure the percentage of power packs 108 to be charged, at operation 412. For example, the charge/discharge module 132 measures that out of 10 supercapacitor units, 5 supercapacitor units are charged below 60 percent and need to be charged up to the threshold limit of 90 percent. Successively, the charge/discharge module 132 may be configured to send data, to the ECS 101, related to energy transfer to the power packs 108 to the ECS 101, at operation 414. For example, the charge/discharge module 132 sends to the ECS 101 that out of 10 supercapacitor units, 5 supercapacitor units are charged below 60 percent and need to be charged up to the threshold limit of 90 percent.

Figure 5:
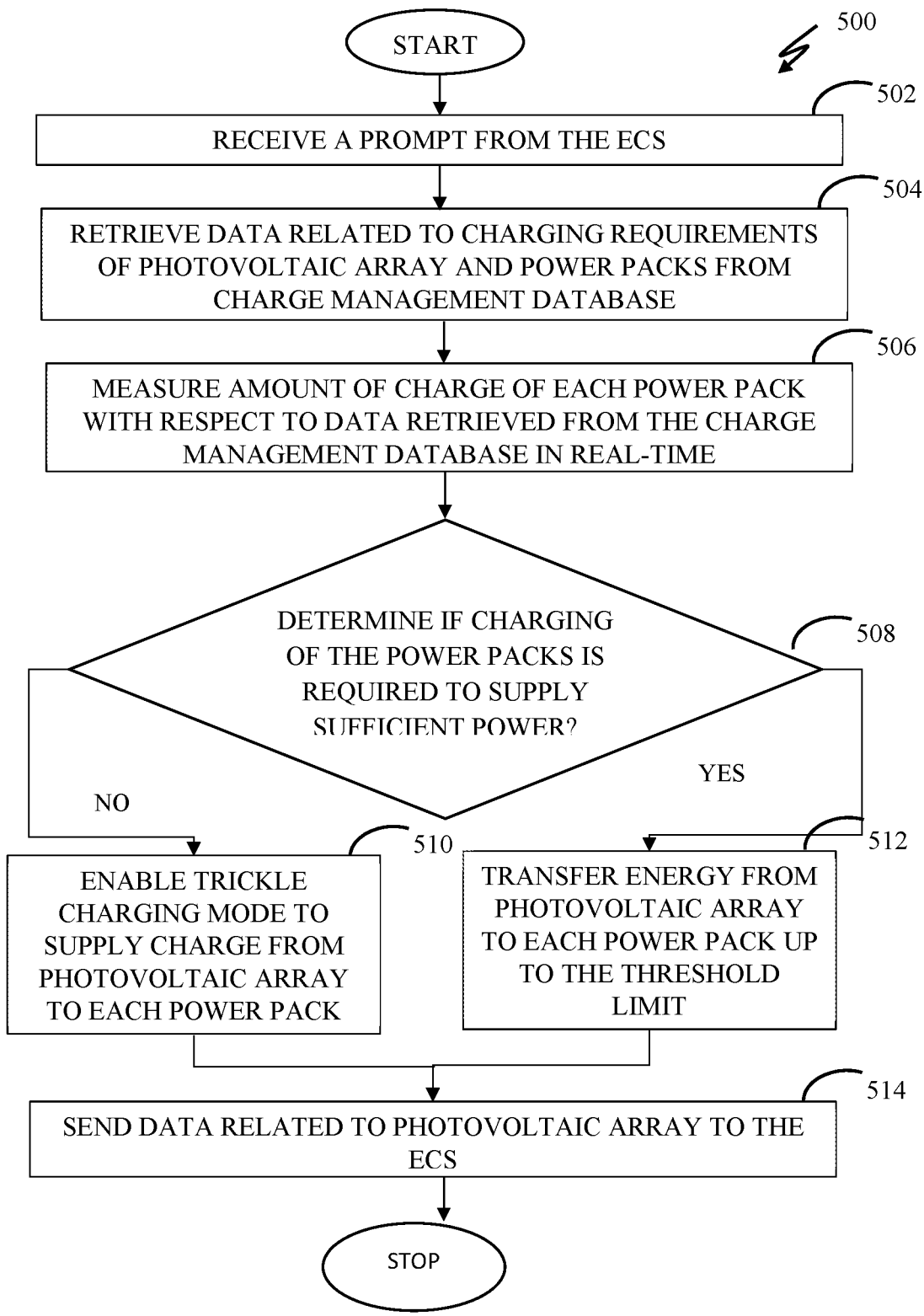
FIG. 5 is a flow diagram illustrating a process for energy management performed by an Artificial Intelligence/Machine Learning (AI/ML) module.

Further, the ECS 101 may be configured to receive the data related to the requirement of charging for the power packs 108 from the charge/discharge module 132, at operation 306. For example, the ECS 101 receives the data that 5 supercapacitor units are charged below 60 percent and need to be charged up to the threshold limit of 90 percent and 5 supercapacitor units are charged up to the threshold limit of 90 percent of their capacity and therefore does not need charging. Successively, the ECS 101 may be configured to trigger the AI/ML module 182, at operation 308. In some examples, the AI/ML module 182 may include the ML engine 1020 and/or the ML model(s) 1025 of FIG. 10. Further, the AI/ML module 182 is described in FIG. 5. FIG. 5 illustrates a flowchart of a process 500 performed by the AI/ML module 182. It should also be noted that in some alternative implementations, the functions noted in the blocks may occur out of the order noted in the drawings. For example, two blocks shown in succession in FIG. 5 may be executed substantially concurrently or the blocks may sometimes be executed in the reverse order, depending upon the functionality involved. In addition, the process descriptions or blocks in flow charts should be understood as representing decisions made by a hardware structure such as a state machine.

AI/ML module 182 in FIG. 5 at operation 508 may use historical data of supercapacitor units test results and charging actions and results to determine a current new trickle charge regime in operation 510. The AI/ML module 182 in FIG. 5 could use correlations methods to data in a database (not shown) or could be trained using supervised learning of could train itself over time using unsupervised learning.

At first, the AI/ML module 182 may be configured to receive a prompt from the ECS 101, at operation 502. The AI/ML module 182 may be configured to manage charge and voltage supplied to each of the power packs 108 from the photovoltaic array 164. In one aspect, the power packs 108 may be supercapacitor units and the threshold limit of each supercapacitor unit may be 90 percent of its capacity. In one aspect, the AI/ML module 182 may be activated and deactivated automatically by the ECS 101 upon receiving a request from the charge/discharge module 132 related to the charging requirement of the power packs 108. Further, the AI/ML module 182 may be configured to retrieve data related to the charging requirement of the photovoltaic array 164 and the power packs 108 from the charge management database 120, at operation 504. In one aspect, the AI/ML module 182 may be configured to retrieve the charging requirement of the power packs 108 to be used or consumed by the electric vehicle, such as golf cart, baby cart, electric car, etc., from the charge management database 120. For example, the AI/ML module 182 retrieves the data related to the charging requirement that 10 supercapacitor units connected in series need to be charged up to the threshold limit of 90 percent of their capacity.

Further, the AI/ML module 182 may be configured to measure the amount of electric charge of each of the power packs 108 with respect to the data retrieved from the charge management database 120 in real-time, at operation 506. In one aspect, the AI/ML module 182 may also measure the amount of charge left within each of the power packs 108 when connected with the system 80. For example, the AI/ML module 182 measures the amount of the electric charge of the 10 supercapacitor units when connected to the system 80, for instance, 3 supercapacitor units are fully drained, 4 supercapacitor units are still charged up to 60 percent and 3 supercapacitor units are charged more than 90 percent of their capacity. Successively, the AI/ML module 182 may determine if charging of each of the power packs 108 is required, at operation 508. For example, the AI/ML module 182 determines, that 3 supercapacitor units need to be recharged from 0 percent of their capacity, 4 supercapacitor units need to be recharged from 60 percent of their capacity and the rest of the 3 supercapacitor units are charged above the threshold limit of 90 percent.

In one case, the AI/ML module 182 may determine that no charging of each of the power packs 108 is required, then the AI/ML module 182 may move forward to operation 510 to enable a trickle charging mode. For example, the AI/ML module 182 determines that the 10 supercapacitor units are charged above the threshold limit of 90 percent. In another case, the AI/ML module 182 may determine that charging of the power packs 108 is required, then the AI/ML module 182 may enable the charge/discharge module 132 to transfer the energy from the photovoltaic array 164 to each supercapacitor power pack up to the threshold limit, at operation 512. For example, the AI/ML module 182 determines that if out of the 10 supercapacitor units, 3 supercapacitor units are completely drained to 0 percent of their capacity, then the AI/ML module 182 proceeds to transfer energy from the photovoltaic array 164 to each supercapacitor power pack up to the threshold limit. Further, the AI/ML module 182 may be configured to enable the trickle charging mode to supply the electric charge from the photovoltaic array 164 to the power packs 108, at operation 510. In one aspect, the trickle charging mode may be configured to charge to each of the power packs 108 above the threshold limit and equal to the self-discharge rate of each supercapacitor power pack while continuously supplying the electric charge to the electric vehicle. For example, the AI/ML module 182 enables the trickle charging mode to supply the computed voltage of 14 V at a current of 20 A from the photovoltaic array 164 to the 10 supercapacitor units which are charged up to the threshold of 90 percent. Further, the AI/ML module 182 may be configured to transfer energy from the photovoltaic array 164 to each of the power packs 108 up to the threshold limit, at operation 512. In one aspect, the AI/ML module 182 may transfer the electric charge from the photovoltaic array 164 to the power packs 108 which are charged below the threshold limit. In one aspect, the threshold limit of the power packs may vary according to the desired usage of the power packs. In one exemplary aspect, the threshold limit of each of 10 supercapacitor units may be up to 90 percent of their capacity to hold the electric charge of 25 Ah or 20 Ah for series or parallel connection. For example, the AI/ML module 182 transfers the electric charge from the photovoltaic array 164 at the voltage of 8V and current of 10 A, to the 3 supercapacitor units which are at 0 percent of their capacity to 90 percent of their capacity, 4 supercapacitor units which are at 60 percent to 90 percent of their capacity.

Successively, the AI/ML module 182 may be configured to send data related to the power packs 108 and photovoltaic array 164 to the ECS 101, at operation 514. For example, the AI/L module 134 sends the data that out of 10 supercapacitor units 3 have been charged to the threshold limit of 90 percent, 4 supercapacitor units are charged to 90 percent from 60 percent and the rest of 3 supercapacitor units are not charged by the photovoltaic array 164. Further, the ECS 101 may be configured to receive the data related to the photovoltaic array 164 and the power packs 108 from the AI/ML module 182 in real-time, at operation 310. For example, the ECS 101 receives the data that out of 10 supercapacitor units, 3 supercapacitor units have been charged to the threshold limit of 90 percent from initially with 0 percent of the electric charge, 4 supercapacitor units are charged to 90 percent from 60 percent and the rest of 3 supercapacitor units are not charged.

Figure 6:
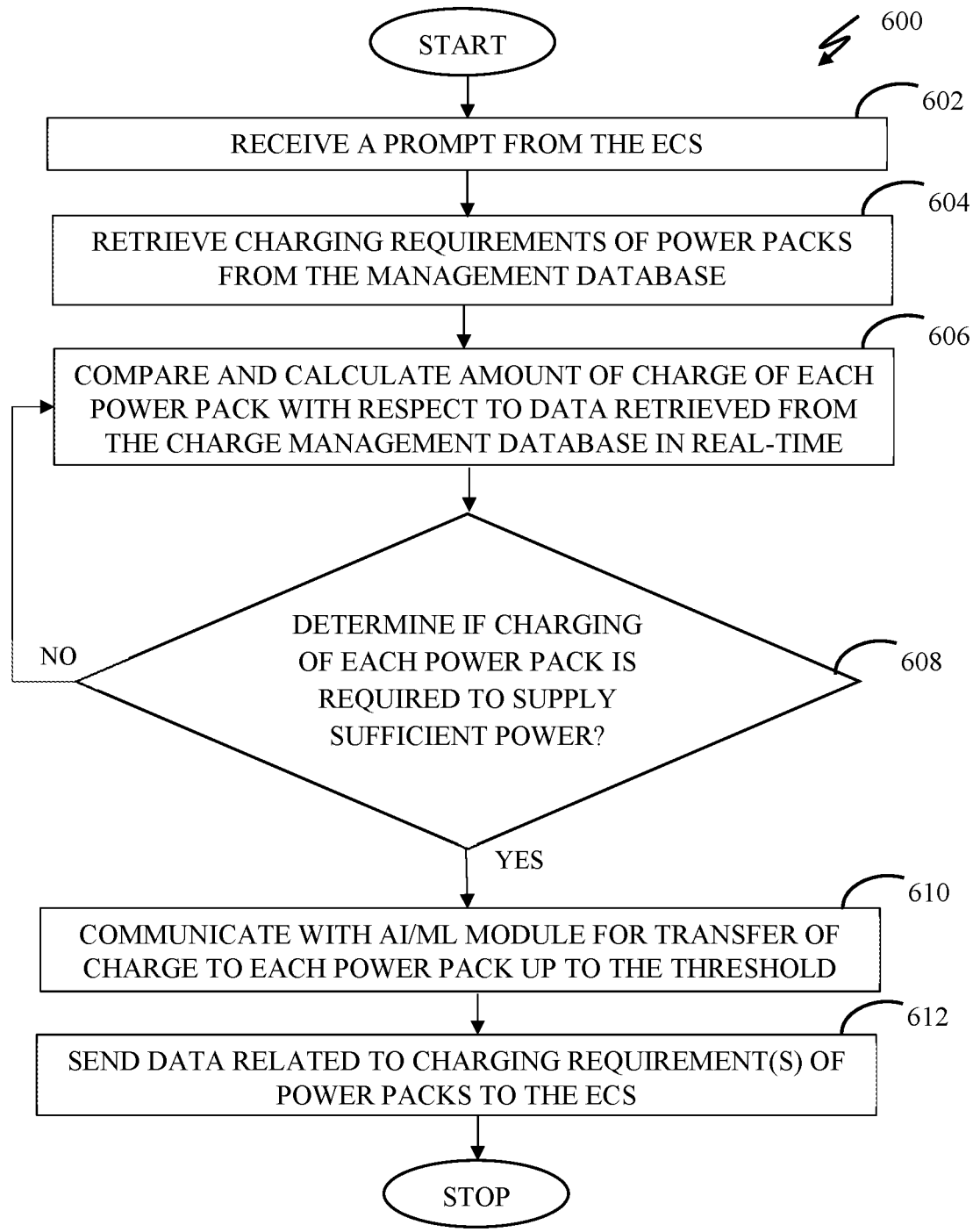
FIG. 6 is a flow diagram illustrating a process for energy management performed by a charge detection module.

Successively, the ECS 101 may be configured to trigger the electrostatic module 184, at operation 312. In one aspect, the ECS 101 may trigger the electrostatic module 184 to determine whether there may be the power packs to charge and/or discharge. Further, the electrostatic module 184 is described in FIG. 6. FIG. 6 illustrates a flowchart of a process 600 performed by the electrostatic module 184. It should also be noted that in some alternative implementations, the functions noted in the blocks may occur out of the order noted in the drawings. For example, two blocks shown in succession in FIG. 6 may be executed substantially concurrently or the blocks may sometimes be executed in the reverse order, depending upon the functionality involved. In addition, the process descriptions or blocks in flow charts should be understood as representing decisions made by a hardware structure such as a state machine.

At first, the electrostatic module 184 may be configured to receive a prompt from the ECS 101, at operation 602. The electrostatic module 184 may be configured to detect the charging capacity and charging requirements of each of plurality of the supercapacitor power packs 108 up to the threshold limit. In one aspect, the supercapacitor power packs 108 may be supercapacitor units and the threshold limit of each supercapacitor unit may be 90 percent of its capacity. In one aspect, the electrostatic module 184 may be activated and deactivated automatically by the ECS 101 upon receiving the data related to the power packs 108 and the photovoltaic array 164 from the AI/ML module 182. Further, the electrostatic module 184 may be configured to retrieve the charging requirement of the power packs 108 from the charge management database 120, at operation 604. In one aspect, the electrostatic module 184 may be configured to retrieve the charging requirement of the power packs 108 to be used or consumed by the electric vehicle, such as golf cart, baby cart, electric car, etc., from the charge management database 120. For example, the electrostatic module 184 retrieves the charging requirements that 10 supercapacitor units connected in series need to be charged equal to more than 90 percent of their capacity.

Further, the electrostatic module 184 may be configured to compare and calculate the amount of electric charge of each of the power packs 108 with respect to data retrieved from the charge management database 120 in real-time, at operation 606. In one aspect, the electrostatic module 184 may also calculate the discharging rate of each of the power packs 108 when connected with the system 80. In one aspect, the electrostatic module 184, calculates the amount of charge left on each of the power packs 108. For example, the electrostatic module 184, calculates that the 10 supercapacitor units, when connected to the system 80, 5 supercapacitor units charged at 90 percent of their capacity are discharging continuously at a rate 5 A/m (Ampere/Minute) and are receiving charge from the photovoltaic array 164 at the rate of 20 A/m and 14V, and rest of 5 supercapacitor units charged at 60 percent of their capacity are discharging at a rate of 12 A/m, which are receiving a charge at the rate of 10 A/m and 8V from the photovoltaic array 164. Successively, the electrostatic module 184 may determine if charging of each of the power packs 108 is required, at operation 608.

In one case, the electrostatic module 184 may determine that charging of each of the supercapacitor power packs 108 is not required, then the electrostatic module 184 is redirected back to operation 606 to compare and calculate the amount of electric charge of each power pack. For example, the electrostatic module 184 determines that the 10 supercapacitor units are charged above the threshold limit of 90 percent of their capacity and each supercapacitor unit is discharging at a constant rate of 5 A/m with respect to charging rate of 20 A/m and 14 V from the photovoltaic array 164. In another case, the electrostatic module 184 may determine that charging of the power packs 108 is required, then the electrostatic module 184 may move to operation 610. For example, the electrostatic module 184 determines that out of 10 supercapacitor units 5 supercapacitor units charged at 60 percent of their capacity are discharging at the rate of 12 A/m with receiving charge from the photovoltaic array 164 at the rate of 10 A/m, and other 5 supercapacitor units charged at 70 percent of their capacity are discharging at the rate of 14 A/m with receiving charge from the photovoltaic array 164 at the rate of 12 A/m. In this case, the electrostatic module 184 proceeds to operation 610 to communicate with the AI/ML module 182 to transfer of charge to each supercapacitor unit up to the threshold limit. In one aspect, the electrostatic module 184 may communicate with the AI/ML module 182 to transfer charge from the photovoltaic array 164. For example, the electrostatic module 184 communicates with the AI/ML module 182 that out of the 10 supercapacitor units 5 supercapacitor units charged at 60 percent of their capacity discharging at the rate of 12 A/m, need charging up to the threshold limit of 90 percent with the rate of 20 A/m from the photovoltaic array 164 and other 5 supercapacitor units charged at 70 percent of their capacity discharging at the rate of 14 A/m, need charging up to the threshold limit of 90 percent with the rate of 20 A/m from the photovoltaic array 164.

Successively, the electrostatic module 184 may be configured to send data related to the charging requirement of the power packs 108 to the ECS 101, at operation 612. For example, the electrostatic module 184 sends that out of the 10 supercapacitor units 5 supercapacitor units charged at 60 percent of their capacity discharging at the rate of 12 A/m, need charging up to the threshold limit of 90 percent with the rate of 20 A/m from the photovoltaic array 164 and other 5 supercapacitor units charged at 70 percent of their capacity discharging at the rate of 14 A/m, need charging up to the threshold limit of 90 percent with the rate of 20 A/m from the photovoltaic array 164. Further, the ECS 101 may be configured to receive the data related to the charging requirement of the power packs 108 from the electrostatic module 184, at operation 314. For example, ECS 101 receive the 10 supercapacitor units 5 supercapacitor units charged at 60 percent of their capacity discharging at the rate of 12 A/m, need charging up to the threshold limit of 90 percent with the rate of 20 A/m from the photovoltaic array 164 and other 5 supercapacitor units charged at 70 percent of their capacity discharging at the rate of 14 A/m, need charging up to the threshold limit of 90 percent with the rate of 20 A/m from the photovoltaic array 164.

Figure 7:
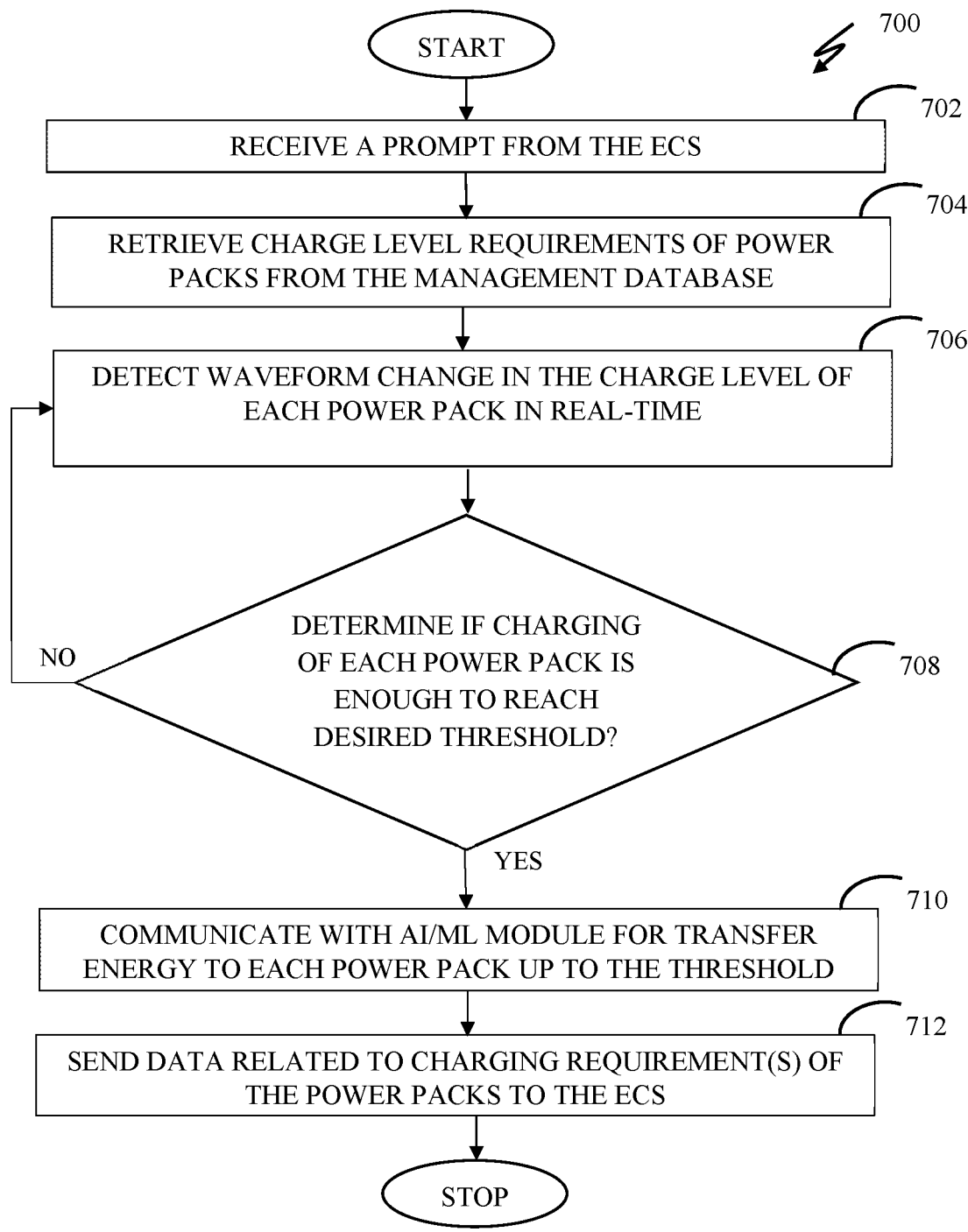
FIG. 7 is a flow diagram illustrating a process for energy management performed by a complex waveform management module.

Successively, the ECS 101 may be configured to trigger the waveform management module 180, at operation 316. In one aspect, the waveform management module 180 may be configured to determine whether there is any waveform change in the charge level and energy level. Further, the waveform management module 180 is described in FIG. 7. FIG. 7 illustrates a flowchart of a process 700 performed by the waveform management module 180. It should also be noted that in some alternative implementations, the functions noted in the blocks may occur out of the order noted in the drawings. For example, two blocks shown in succession in FIG. 7 may be executed substantially concurrently or the blocks may sometimes be executed in the reverse order, depending upon the functionality involved. In addition, the process descriptions or blocks in flow charts should be understood as representing decisions made by a hardware structure such as a state machine.

At first, the waveform management module 180 may be configured to receive a prompt from the ECS 101, at operation 702. The waveform management module 180 may be configured to determine waveform change during charging of the power packs 108 from the photovoltaic array 164. In one aspect, the waveform management module 180 may be activated and deactivated automatically by the ECS 101 upon receiving the request from the AI/ML module 182 and the electrostatic module 184, related to the charging requirement of the power packs 108. Further, the waveform management module 180 may be configured to retrieve the charging requirement of the power packs 108 from the charge management database 120, at operation 704. In one aspect, the waveform management module 180 may be configured to retrieve the charging requirement of the power packs 108 to be used or consumed by the electric vehicle, such as golf cart, baby cart, electric car, etc., from the charge management database 120. For example, the waveform management module 180 retrieves the charging requirements from the charge management database 120 that 10 lead-acid batteries connected in series need to be charged equal to or more than 90 percent of their capacity.

Further, the waveform management module 180 may be configured to detect waveform change in the charge level of each of the power packs 108 in real-time, at operation 706. In one aspect, the waveform management module 180 may also detect the amount of charge left with each of the power packs 108 when connected with the system 80. In another aspect, the waveform management module 180, detects the change in the waveform in a charge level of each of the power packs 108. For example, the waveform management module 180 detects that out of the 10 supercapacitor units when connected to the system 80, 5 supercapacitor units with 80 percent capacity receive charge from the photovoltaic array 164 at the rate of 12 A/m and the other 5 supercapacitor units with 90 percent capacity receive charge from the photovoltaic array 164 at the rate of 20 A/m.

Successively, the waveform management module 180 may determine if charging of each of the power packs 108 is enough to reach the desired threshold, at operation 708. In one aspect, the waveform management module 180 may determine whether each of the power packs 108 are receiving enough charge to reach the threshold limit. In one aspect, the threshold limit of supercapacitor units may be 90 percent of their capacity to store the electric charge.

In one case, the waveform management module 180 may determine that each supercapacitor power pack is receiving enough charging from the photovoltaic array 106, then the waveform management module 180 is redirected back to operation 706 to again detect waveform change in the charge level of each of the power packs 108. For example, the waveform management module 180 determines that each of the 10 supercapacitor units is receiving 20 A of charge to reach equal to or more than 90 percent of their capacity. In another case, the waveform management module 180 may determine that the power packs 108 are receiving less charge to reach the threshold limit of 90 percent, then the waveform management module 180 may move to operation 710 to communicate with AI/ML module 182 for transferring energy to each power pack is enough. For example, the waveform management module 180 determines that 10 supercapacitor units are receiving 10 A of charge to reach the threshold limit of 90 percent. In this case, the waveform management module 180 may proceed to operation 710 to AI/ML module 182 for transfer of charge to each of the power packs 108 to reach up to the threshold limit. In one aspect, the waveform management module 180 communicates with the AI/ML module 182 that 10 supercapacitor units are receiving 10 A of charge and to reach up to the threshold limit of 90 percent, 20 A of charge is needed from the photovoltaic array 164.

Successively, the waveform management module 180 may be configured to send data related to the charging requirement of the power packs 108 to the ECS 101, at operation 712. For example, the waveform management module 180 is configured to send that 10 supercapacitor units are receiving 10 A of charge and to reach up to the threshold limit of 90 percent, 20 A of charge is needed from the photovoltaic array 164. Further, the ECS 101 may be configured to receive the data related to the charging requirement of the power packs 108 from the waveform management module 180, at operation 318. For example, the ECS 101 receives that the 10 supercapacitor units are receiving 10 A of charge and to reach up to the threshold limit of 90 percent, 20 A of charge is needed from the photovoltaic array 164.

Figure 8:
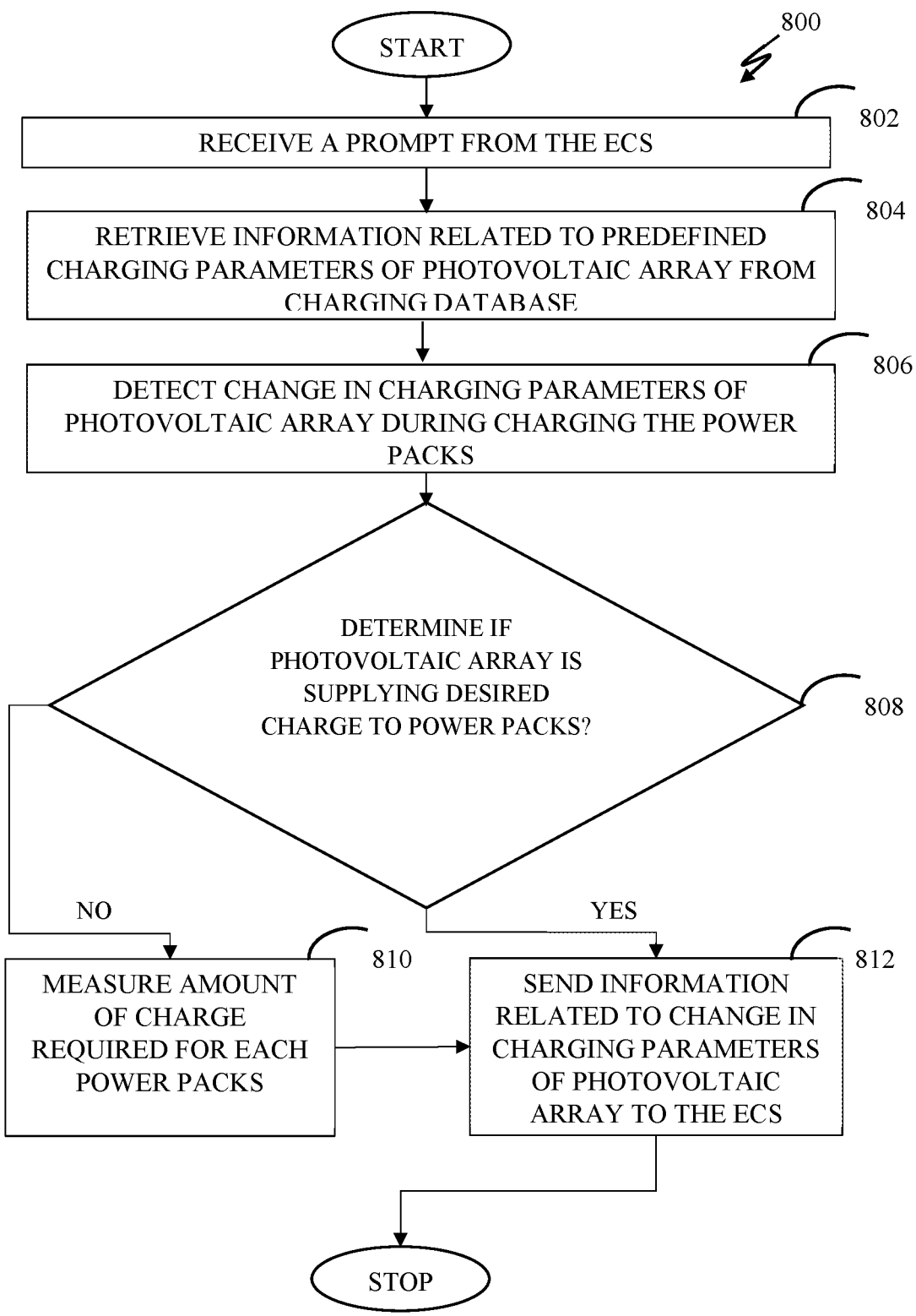
FIG. 8 is a flow diagram illustrating a process for energy management performed by a spatial energy management module.

Further, the ECS 101 may be configured to trigger the spatial energy management module 186, at operation 320. In one aspect, the spatial energy management module 186 may be configured to identify problems in spatial energy change of the photovoltaic array 164 during charging of the power packs 108. The spatial energy management module 186 is described in conjunction with FIG. 8. FIG. 8 illustrates a flowchart of a process 800 performed by the spatial energy management module 186. It should also be noted that in some alternative implementations, the functions noted in the blocks may occur out of the order noted in the drawings. For example, two blocks shown in succession in FIG. 8 may be executed substantially concurrently or the blocks may sometimes be executed in the reverse order, depending upon the functionality involved. In addition, the process descriptions or blocks in flow charts should be understood as representing decisions made by a hardware structure such as a state machine.

At first, the spatial energy management module 186 may be configured to receive a prompt from the ECS 101, at operation 802. The spatial energy management module 186 may be configured to determine a change in spatial energy received by the photovoltaic array 164. Further, the spatial energy management module 186 may be configured to retrieve information related to the predefined charging parameters of the photovoltaic array 164 from the charge management database 120, at operation 804. In one aspect, the spatial energy management module 186 may be configured to retrieve information related to predefined charging parameters of the photovoltaic array 164 from charge management database 120. In one aspect, the predefined charging parameters may be a preset voltage of the photovoltaic cells 166 of the photovoltaic array 164. For example, the spatial energy management module 186 retrieves information that the preset voltage of the photovoltaic cells 166 of the photovoltaic array 164 is 15V to charge the 10 supercapacitor units up to the threshold limit of 90 percent. Further, the spatial energy management module 186 may be configured to detect the change in charging parameters of the photovoltaic array 164 during charging of the power packs 108 in real-time, at operation 806. In one aspect, during charging of the power packs 108 there may be a change in preset voltage of the photovoltaic cells 166 due to a change in spatial energy flowing towards the photovoltaic array 164. For example, the spatial energy management module 186 detects that the photovoltaic array 164 is generating a voltage of 14 V with the current at the rate of 20 A/m to charge the 10 supercapacitor units up to the threshold limit of 90 percent.

Successively, the spatial energy management module 186 may determine, if the photovoltaic array 164 is supplying desired electric charge to the power packs 108, at operation 808. In one aspect, the spatial energy management module 186 may be configured to determine whether the photovoltaic array 164 is supplying enough electric charge to each of the power packs 108 to reach the threshold limit of 90 percent. In one case, the spatial energy management module 186 may determine that photovoltaic array 164 is supplying the desired electric charge for the power packs 108 to reach above the threshold limit, then the spatial energy management module 186 may proceed to operation 810 to measure the amount of the electric charge required for each of the power packs 108. For example, the spatial energy management module 186 determines that the photovoltaic array 164 is supplying the electric charge at the rate of 20 A/m for the 10 supercapacitor units to reach the threshold limit of 90 percent.

In another case, the spatial energy management module 186 may determine that that photovoltaic array 164 is not supplying the desired electric charge for the power packs 108 to reach above the threshold limit, then the spatial energy management module 186 may move to operation 810. For example, the spatial energy management module 186 determines that the photovoltaic array 164 is supplying the electric charge at the rate of 10 A/m which is 10 A less than the desired electric charge for the 10 supercapacitor units to reach the threshold limit of 90 percent. The spatial energy management module 186 may be configured to measure the amount of charge required for each supercapacitor power pack, at operation 810. In one aspect, the spatial energy management module 186 may measure the amount of electric charge for each of the power packs 108 to reach the threshold limit. For example, the spatial energy management module 186 measures that the 10 supercapacitor units are charged only 60 percent of their capacity when receiving the electric charge at the rate of 10 A/m from the photovoltaic array 164 and therefore, need the electric charge at the rate of 20 A/m to reach the threshold limit of 90 percent. Further, the spatial energy management module 186 may be configured to send the information related to the change in the charging parameters of the photovoltaic array 164 to the ECS 101, at operation 812. For example, the spatial energy management module 186 sends that the 10 supercapacitor units are charged only 60 percent of their capacity when receiving the electric charge at the rate of 10 A/m from the photovoltaic array 164 and therefore, need the electric charge at the rate of 20 A/m to reach the threshold limit of 90 percent Successively, the ECS 101 may be configured to receive information related to the change in a parameter of the photovoltaic array 106, at operation 322. For example, the ECS 101 receives that the 10 supercapacitor units are charged only 60 percent of their capacity when receiving the electric charge at the rate of 10 A/m from the photovoltaic array 164 and therefore, need the electric charge at the rate of 20 A/m to reach the threshold limit of 90 percent.

Figure 9:
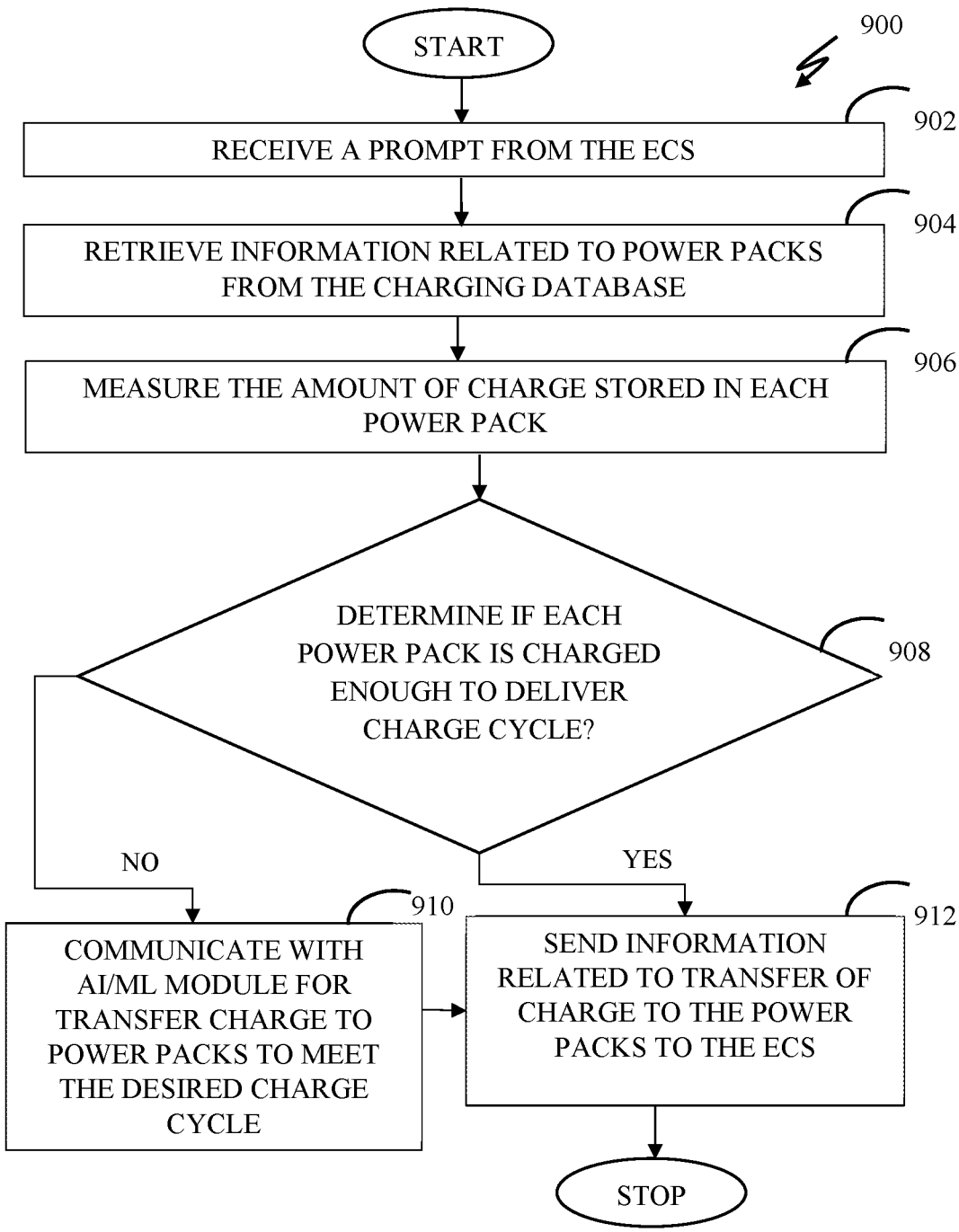
FIG. 9 is a flow diagram illustrating a process for energy management performed by a communication module.

Further, the ECS 101 may be configured to trigger the communication module 128, at operation 324. Further, the communication module 128 is described in FIG. 9. FIG. 9 illustrates a flowchart of a process 900 performed by the communication module 128. It should also be noted that in some alternative implementations, the functions noted in the blocks may occur out of the order noted in the drawings. For example, two blocks shown in succession in FIG. 9 may be executed substantially concurrently or the blocks may sometimes be executed in the reverse order, depending upon the functionality involved. In addition, the process descriptions or blocks in flow charts should be understood as representing decisions made by a hardware structure.

At first, the communication module 128 may be configured to receive a prompt from the ECS 101, at operation 902. The communication module 128 may be configured to facilitate communication between the spatial energy management module 186, the waveform management module 180, the electrostatic module 184, and the AI/ML module 182 to charge the power packs 108 to meet the desired charge cycle. In one aspect, the desired charge cycle of each of the power packs 108 may be 2 hours when each power pack is charged up to the threshold limit of 90 percent. In one aspect, the communication module 128 may be configured to be activated and/or deactivated by the ECS 101 according to the information received from the spatial energy management module 186 the waveform management module 180, the electrostatic module 184, and the AI/ML module 182 to charge and/or discharge the power packs 108 respectively. Successively, the communication module 128 may be configured to retrieve information related to the power packs 108 from the charge management database 120, at operation 904. In one aspect, the communication module 128 may retrieve information that each of the power packs 108 are charged below the threshold limit. For example, the communication module 128 retrieves information that the 10 supercapacitor units are charged nearly 80 percent of their capacity, which is below the threshold limit of 90 percent to deliver the desired charge cycle of 20 hours.

AI/ML module 182 in FIG. 5 at operation 508 may use historical data of supercapacitor units test results and charging actions and results to determine a current new trickle charge regime in operation 510. The AI/ML module 182 in FIG. 5 could use correlations methods to data in a database (not shown) or could be trained using supervised learning of could train itself over time using unsupervised learning.

Further, the communication module 128 may be configured to measure the amount of electric charge stored in each of the power packs 108, at operation 906. In one aspect, the communication module 128 may be configured to measure the charge stored in each of the power packs 108 For example, communication module 128 measures that out of the 10 supercapacitor units 5 are charged 70 percent of their capacity, 4 are charged 60 percent of their capacity, and 1 is charged above the threshold limit of 90 percent, by the AI/ML module 182.

Further, the communication module 128 may determine if each of the power packs 108 is charged enough to deliver the charge cycle, at operation 908. In one aspect, the communication module 128 may determine whether each of the power packs 108 are charged enough for consumption or to be used during the specified or desired charge cycle. In one case, the communication module 128 may determine that if the power packs 108 are not charged equal to or above the threshold limit to deliver the desired charge cycle from each of the power packs 108. For example, the communication module 128 determines that if the desired charge cycle from the 10 supercapacitor units are 20 hours and out of the 10 supercapacitor units, 6 supercapacitor units are charged 90 percent of their capacity, and 4 supercapacitor units are charged near 60 percent of their capacity, and the overall charge cycle of the 10 supercapacitor units are 16 hours, which is 4 hours less than the desired charge cycle. In this case, the communication module 128 may proceed to operation 910 to communicate with the AI/ML module 182 for transferring the electric charge to the power packs 108 to meet the desired charge cycle.

In another case, the communication module 128 may determine that if the power packs 108 are charged equal to above the threshold limit to deliver the desired charge cycle. For example, the communication module 128 determines that if the desired charge cycle from the 10 supercapacitor units are 20 hours, and each of the 10 supercapacitor units is charged above the threshold limit of 90 percent to deliver the charge cycle of 20 hours (2 hours from each supercapacitor units). In this case, the communication module 128 may proceed to operation 912 to send the information related to electric charge transfer to the power packs 108 to the ECS 101.

Successively, the communication module 128 may be configured to charge the power packs 108 to meet the desired charge cycle, at operation 910. For example, the communication module 128 communicates that the 10 supercapacitor units if the desired charge cycle from the 10 supercapacitor units are 20 hours, and out of the 10 supercapacitor units, 6 are charged 90 percent of their capacity, and 4 are charged near 60 percent of their capacity, and the overall charge cycle of the 10 capacitor units are 16 hours, which is 4 hours less than the desired charge cycle, then the communication module 128 communicates the AI/ML module 182 to charge the rest of 4 supercapacitor units up to the threshold limit of 90 percent to meet the desired charge cycle of 2 hours from each of the 10 supercapacitor units. Further, the communication module 128 may be configured to send the information related to the transfer of the electric charge to the power packs 108 to the ECS 101, at operation 912. For example, the communication module 128 is configured to send to the ECS 101 that each of the 10 supercapacitor units is charged above the threshold limit of 90 percent to deliver the desired charging cycle of 20 hours.

Successively, the ECS 101 receives the information related to the transfer of the electric charge to the power packs 108, at operation 326. For example, the ECS 101 receives that each of the 10 supercapacitor units is charged above the threshold limit of 90 percent to deliver the desired charging cycle of 20 hours. Further, the ECS 101 may be configured to send the information related to the transfer of the electric charge to the power packs 108 to the display interface 146, at operation 328. For example, the ECS 101 sends that each of the 10 supercapacitor units are charged above the threshold limit of 90 percent to deliver the desired charging cycle of 20 hours and displays the information that 10 supercapacitor units are charged above the threshold limit of 90 percent to deliver the desired charging cycle of 20 hours.

Figure 10:
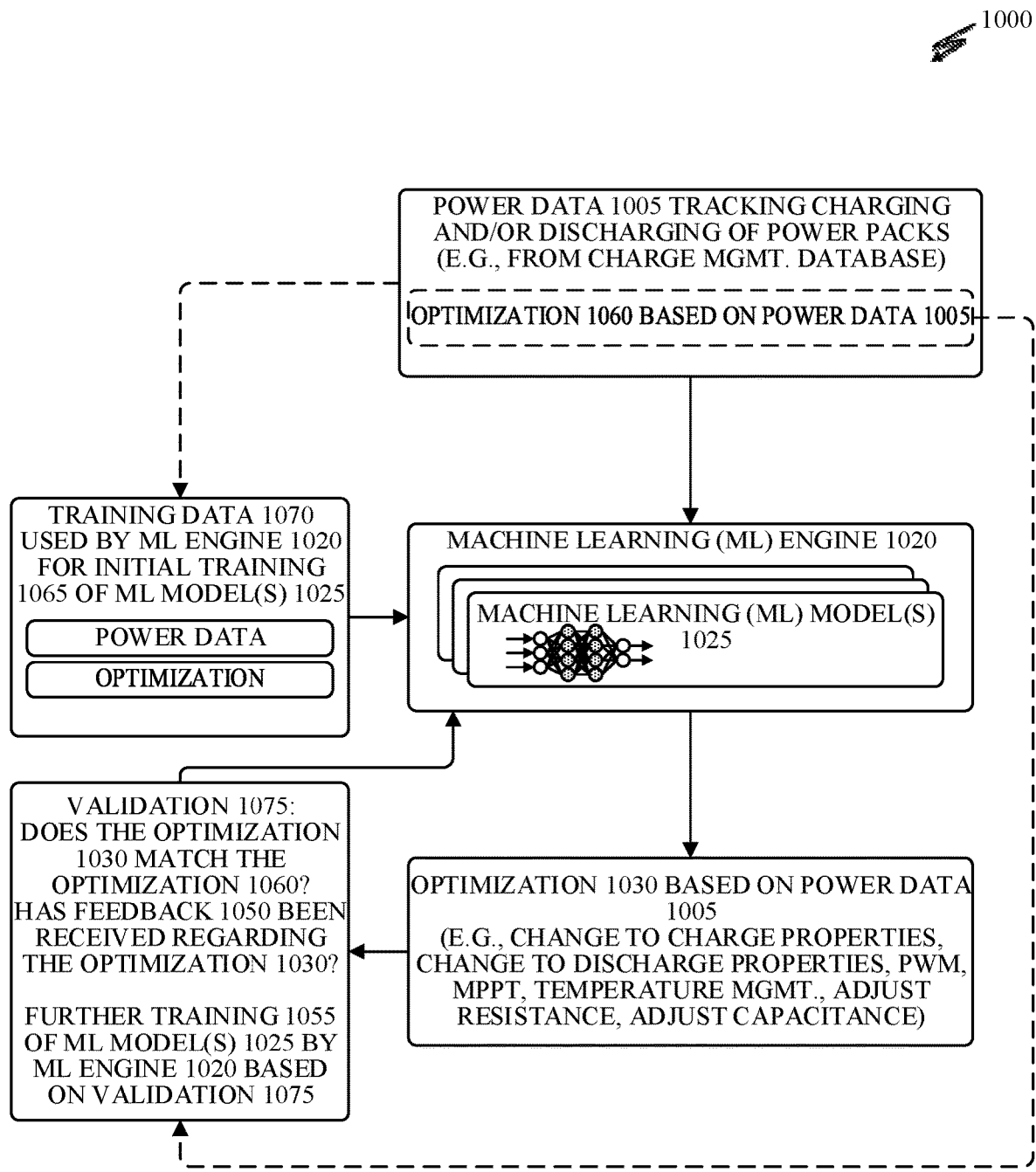
FIG. 10 is a block diagram illustrating use of one or more trained machine learning models of a machine learning engine to generate an optimization based on power data.

FIG. 10 is a block diagram 1000 illustrating use of one or more trained machine learning models 1025 of a machine learning engine 1020 to generate an optimization 1030 based on power data 1005. The ML engine 1020 and/or the ML model(s) 1025 can include one or more neural network (NNs), one or more convolutional neural networks (CNNs), one or more trained time delay neural networks (TDNNs), one or more deep networks, one or more autoencoders, one or more deep belief nets (DBNs), one or more recurrent neural networks (RNNs), one or more generative adversarial networks (GANs), one or more conditional generative adversarial networks (cGANs), one or more other types of neural networks, one or more trained support vector machines (SVMs), one or more trained random forests (RFs), one or more computer vision systems, one or more deep learning systems, one or more classifiers, one or more transformers, or combinations thereof. Within FIG. 10, a graphic representing the trained ML model(s) 1025 illustrates a set of circles connected to another. Each of the circles can represent a node, a neuron, a perceptron, a layer, a portion thereof, or a combination thereof. The circles are arranged in columns. The leftmost column of white circles represent an input layer. The rightmost column of white circles represent an output layer. Two columns of shaded circled between the leftmost column of white circles and the rightmost column of white circles each represent hidden layers. The ML engine 1020 and/or the ML model(s) 1025 can be part of the AI/ML module 182.

Once trained via initial training 1065, the one or more ML models 1025 receive, as an input, power data 1005 that tracks charging a set of power packs (e.g., from a photovoltaic array, regenerative braking, or another power source) and/or discharging of a set of power packs (e.g., to power other components of an electric vehicle, such as propulsion mechanisms). The power data 1005 may be received from one or more sensors 126, such as sensors to measure voltage, current, resistance, capacitance, inductance, frequency, power, and/or continuity. In some examples, the one or more sensors 126 can include one or more voltmeters, ammeters, ohmmeters, capacimeters, inductance meters, wattmeters, multimeters, or a combination thereof. In some examples, the power data 1005 may be received from a charge management database, where the power data 1005 may be stored after measurement by the sensors 126. In some examples, the ML engine 1020 and/or the one or more ML models 1025 can also receive, as a second input, a predetermined optimization 1060 that is based on (or otherwise corresponds to) the power data 1005.

In response to receiving the power data 1005 as an input(s), the one or more ML models 1025 generate an optimization 1030 to power flow. The optimization 1030 to power flow can indicate a change (e.g., increase or decrease) to one or more charging properties (e.g., charging rate, voltage, current, resistance, capacitance, inductance, frequency, power, and/or continuity), a change (e.g., increase or decrease) to one or more discharging properties (e.g., discharging rate, voltage, current, resistance, capacitance, inductance, frequency, power, and/or continuity), PWM, MPPT, change(s) to temperature management (e.g., enabling or disabling a fan, increasing or decreasing fan speed, increasing or decreasing charging or discharging properties to adjust temperature, etc.), adjusting other circuit properties (e.g., voltage, current, resistance, capacitance, inductance, frequency, power, and/or continuity), any other optimizations discussed herein, or a combination thereof. Generating the optimization 1030 as in FIG. 10 can correspond to operations in at least FIGS. 3A, 3B, 4, 5, 6, 7, 8, 9, and/or 11. It should be understood that the pre-determined optimization 1060 can likewise include any of the types of optimizations and/or modifications listed above with respect to the optimization 1030.

Once the one or more ML models 1025 generate the optimization 1030, the optimization 1030 can be output to an energy control system that can control flow of power (e.g., for charging and/or discharging the power packs) and that can implement the optimization 1030 by implementing one or more modifications to the flow of power, such as any of the modifications listed above with respect to the optimization 1030.

Before using the one or more ML models 1025 to generate the optimization 1030, the ML engine 1020 performs initial training 1065 of the one or more ML models 1025 using training data 1070. The training data 1070 can include examples of power data (e.g., as in the power data 1005) and/or examples of pre-determined optimizations (e.g., as in the pre-determined optimization 1060). In some examples, the pre-determined optimizations in the training data 1070 are optimizations that the one or more ML models 1025 previously generated based on the power data in the training data 1070. In the initial training 1065, the ML engine 1020 can form connections and/or weights based on the training data 1040, for instance between nodes of a neural network or another form of neural network. For instance, in the initial training 1065, the ML engine 1020 can be trained to output the pre-determined optimizations in the training data 1070 in response to receipt of the corresponding power data in the training data 1070.

During a validation 1075 of the initial training 1065 (and/or further training 1055), the power data 1005 (and/or the exemplary power data in the training data 1070) is input into the one or more ML models 1025 to generate an optimization 1030 as described above. The ML engine 1020 performs validation 1075 at least in part by determining whether the optimization 1030 matches the pre-determined optimization 1060 (and/or the pre-determined optimization in the training data 1070). If the optimization 1030 matches the pre-determined optimization 1060 during validation 1075, then the ML engine 1020 performs further training 1055 of the one or more ML models 1025 by updating the one or more ML models 1025 to reinforce weights and/or connections within the one or more ML models 1025 that contributed to the generation of the optimization 1030, encouraging the one or more ML models 1025 to generate similar optimizations given similar inputs. If the optimization 1030 does not match the pre-determined optimization 1060 during validation 1075, then the ML engine 430 performs further training 1055 of the one or more ML models 1025 by updating the one or more ML models 1025 to weaken, remove, and/or replace weights and/or connections within the one or more ML models that contributed to the generation of the optimization 1030, discouraging the one or more ML models 1025 to generate similar optimizations given similar inputs.

Validation 1075 and further training 1055 of the one or more ML models 1025 can continue once the one or more ML models 1025 are in use based on feedback 1050 received regarding the optimization 1030. In some examples, the feedback 1050 can be received from a user via a user interface, for instance via an input from the user interface that approves or declines use of the optimization 1030. In some examples, the feedback 1050 can be received from another component or subsystem of the vehicle (e.g., an energy control system), for instance based on whether the component or subsystem successfully uses the optimization 1030, whether use the optimization 1030 causes any problems for the component or subsystem (e.g., which may be detected using the sensors 126), whether use the optimization 1030 actually ends up optimizing flow of power (e.g., for charging and/or discharging of the power packs), or a combination thereof. If the feedback 1050 is positive (e.g., expresses, indicates, and/or suggests approval of the optimization 1030, success of the optimization 1030, and/or lack of problems with the optimization 1030), then the ML engine 1020 performs further training 1055 of the one or more ML models 1025 by updating the one or more ML models 1025 to reinforce weights and/or connections within the one or more ML models 1025 that contributed to the generation of the optimization 1030, encouraging the one or more ML models 1025 to generate similar optimizations given similar inputs. If the feedback 1050 is negative (e.g., expresses, indicates, and/or suggests disapproval of the optimization 1030, failure of the optimization 1030, and/or problems caused by the optimization 1030) then the ML engine 430 performs further training 1055 of the one or more ML models 1025 by updating the one or more ML models 1025 to weaken, remove, and/or replace weights and/or connections within the one or more ML models that contributed to the generation of the optimization 1030, discouraging the one or more ML models 1025 to generate similar optimizations given similar inputs.

Figure 11:
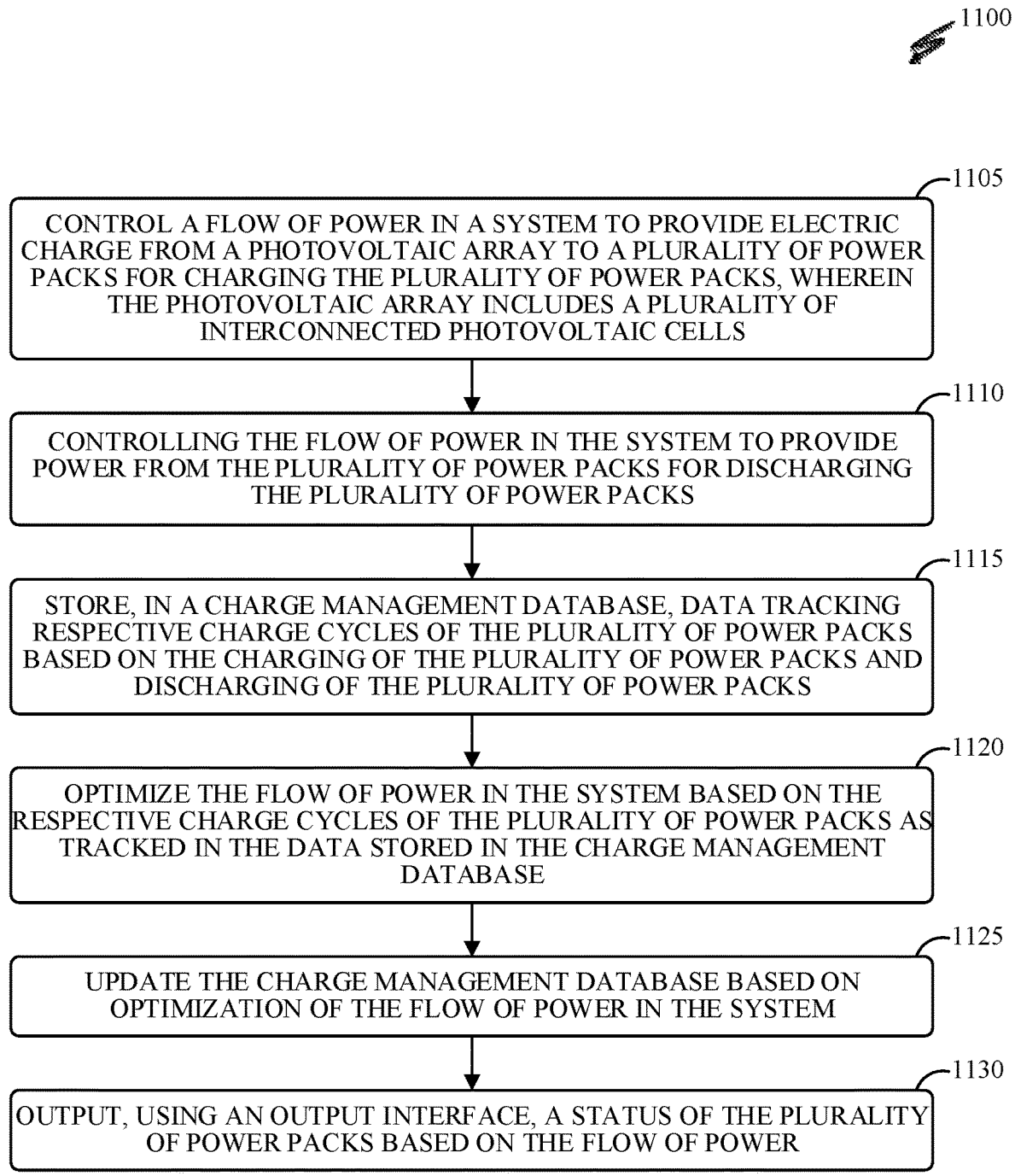
FIG. 11 is a flow diagram illustrating a process for energy management performed using an energy control system.

FIG. 11 is a flow diagram illustrating a process 1100 for energy management performed using an energy control system. The energy control system that performs the process 1100 can include the energy management system 80, the energy storage unit 100, the energy control system 101, the vehicle or device 162, the photovoltaic array 164 and/or trickle source, the cloud 114, the charge management database 120, the energy management module of FIGS. 3A-3B, the energy control system (ECS) of FIGS. 4-9, the ML engine 1020 of FIG. 10, an apparatus, a non-transitory computer-readable storage medium coupled to a processor, component(s) or subsystem(s) of any of these systems, or a combination thereof.

At operation 1105, the energy control system is configured to, and can, control a flow of power in a system to provide electric charge from a photovoltaic array to a plurality of power packs for charging the plurality of power packs. The photovoltaic array includes a plurality of interconnected photovoltaic cells. Examples of the plurality of power packs include the power packs 108 of the energy storage unit (ESU) of FIG. 1. In some examples, the plurality of power packs include at least one battery, at least one capacitor, at least one supercapacitor, or a combination thereof. Examples of the photovoltaic array include the photovoltaic array 164 and/or trickle source. Examples of the photovoltaic cells include the photovoltaic cells 166.

In some examples, at least a subset of the plurality of power packs are coupled together in series. In some examples, at least a subset of the plurality of power packs are coupled together in parallel.

In some examples, the energy control system also includes a regenerative braking mechanism that is coupled with the plurality of power packs and that is configured to supply electric charge to the plurality of power packs for charging the plurality of power packs. The regenerative braking mechanism can slow down movement of the vehicle, and, in the process, convert kinetic energy of the vehicle into stored energy for charging the power packs, for instance using an electric traction motor.

At operation 1110, the energy control system is configured to, and can, control the flow of power in the system to provide power from the plurality of power packs for discharging the plurality of power packs. In some examples, the system is a vehicle or device 162, such as an electric vehicle. In some examples, the discharging of the plurality of power packs is used to power components and/or subsystems of the system, such as a propulsion system of the vehicle, an output interface (e.g., display(s) and/or speaker(s)) of the vehicle, a steering or braking assistance system, or another component or subsystem identified herein. In some examples, the system (e.g., the vehicle or device 162, or electric vehicle) includes at least the plurality of power packs, the photovoltaic array, the energy control system, and the output interface of the process 1100.

At operation 1115, the energy control system is configured to, and can, store, in a charge management database, data tracking respective charge cycles of the plurality of power packs based on the charging of the plurality of power packs and discharging of the plurality of power packs. Examples of the charge management database include the databases in external memory 144, the charge management database 120, and the charge management database in any of FIGS. 4-9.

At operation 1120, the energy control system is configured to, and can, optimize the flow of power in the system based on the respective charge cycles of the plurality of power packs as tracked in the data stored in the charge management database.

In some examples, the energy control system is configured to, and can, input the data tracking the respective charge cycles of the plurality of power packs (e.g., that is stored in the charge management database in operation 1115) into a trained machine learning model (e.g., the ML model(s) 1025 of FIG. 10) to optimize the flow of power based on the respective charge cycles of the plurality of power packs. For instance, the data tracking the respective charge cycles of the plurality of power packs can be an example of the power data 1005 that is input into the ML model(s) 1025 in FIG. 10, and the optimization 1030 output by the ML model(s) 1025 can be an example of an optimization output by the trained machine learning model in operation 1120 to optimize the flow of power based on the respective charge cycles of the plurality of power packs.

In some examples, the energy control system is configured to, and can, identify a modification to the flow of power to optimize the flow of power, and can use the modification to the flow of power as training data to update the trained machine learning model. For instance, the optimization 1030 may be an example of the modification to the flow of power, and the further training 1055 of the ML model(s) 1025 can be an example of use of the modification to the flow of power as training data to update the trained machine learning model.

In some examples, to optimize the flow of power, the energy control system is configured to, and can, analyze the data tracking the respective charge cycles of the plurality of power packs to identify a remaining useful life of at least one of the plurality of power packs, to identify a remaining charge of at least one of the plurality of power packs, to identify a maintenance need of at least one of the plurality of power packs to optimize the flow of power based on the respective charge cycles of the plurality of power packs, or a combination thereof.

At operation 1125, the energy control system is configured to, and can, update the charge management database based on optimization of the flow of power in the system. For instance, the energy control system can update the charge management database to add one or more records, entries, rows, and/or columns of data indicative of the optimization of the flow of power in the system.

At operation 1130, the energy control system is configured to, and can, output, using an output interface, a status of the plurality of power packs based on the flow of power. In some examples, the status is indicative of the optimization(s) and/or effect(s) of the optimization(s) on the charging and the discharging of the power packs, on the flow or power, and/or on the power packs. In some examples, the output interface includes a display, and the energy control system is configured to, and can, output the status of the plurality of power packs by displaying the status using the display. In some examples, the output interface includes a speaker, and the energy control system is configured to, and can, output the status of the plurality of power packs by playing the status using the speaker.

Aspects of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other types of media/machine-readable medium suitable for storing electronic instructions (e.g., computer programming code, such as software or firmware). Moreover, aspects of the present disclosure may also be downloaded as one or more computer program products, wherein the program may be transferred from a remote computer to a requesting computer by way of data signals embodied in a carrier wave or other propagation medium via a communication link (e.g., a modem or network connection).

All patents and patent applications cited are to be understood as being incorporated by reference to the degree they are compatible herewith.

For all ranges given herein, it should be understood that any lower limit may be combined with any upper limit, when feasible. Thus, for example, citing a temperature range of from 5° C. to 150° C. and from 20° C. to 200° C. would also inherently include a range of from 5° C. to 200° C. and a range of 20° C. to 150° C.

When listing various aspects of the products, methods, or system described herein, it should be understood that any feature, element or limitation of one aspect, example, or claim may be combined with any other feature, element or limitation of any other aspect when feasible (i.e., not contradictory). Thus, disclosing an example of power pack comprising a temperature sensor and then a separate example of a power pack associated with an accelerometer would inherently disclose a power pack comprising or associated with an accelerometer and a temperature sensor.

Unless otherwise indicated, components such as software modules or other modules may be combined into a single module or component, or divided such that the function involves cooperation of two or more components or modules. Identifying an operation or feature as a discrete single entity should be understood to include division or combination such that the effect of the identified component is still achieved.

What is claimed is:

1. A system for energy management, the system comprising:
    a plurality of power packs that are coupled together;
    a photovoltaic array that is coupled with the plurality of power packs and that supplies electric charge to the plurality of power packs for charging the plurality of power packs, wherein the photovoltaic array includes a plurality of interconnected photovoltaic cells;
    a charge management database that stores data tracking respective charge cycles of the plurality of power packs based on the charging of the plurality of power packs and discharging of the plurality of power packs;
    an energy control system comprising a processor with access to a memory, wherein the energy control system controls flow of power to control the charging of the plurality of power packs and the discharging of the plurality of power packs, wherein the energy control system inputs the data tracking the respective charge cycles of the plurality of power packs into a trained machine learning model identify at least one optimization to use to optimize the flow of power based on the respective charge cycles of the plurality of power packs as tracked in the data stored in the charge management database, wherein the energy control system updates the charge management database based on optimization of the flow of power; and
    an output interface that is coupled to the energy control system and that outputs a status of the plurality of power packs based on the flow of power as optimized.

2. The system of claim 1, wherein the discharging of the plurality of power packs is used to power propulsion of an electric vehicle, wherein the electric vehicle includes at least the plurality of power packs, the photovoltaic array, the energy control system, and the output interface.

3. The system of claim 1, wherein the energy control system identifies a modification to the flow of power to identify the at least one optimization to the flow of power, wherein the energy control system uses the modification to the flow of power as training data to update the trained machine learning model.

4. The system of claim 1, wherein at least a subset of the plurality of power packs are coupled together in series.

5. The system of claim 1, wherein at least a subset of the plurality of power packs are coupled together in parallel.

6. The system of claim 1, wherein the energy control system analyzes the data tracking the respective charge cycles of the plurality of power packs to identify a remaining useful life of at least one of the plurality of power packs to optimize the flow of power based on the respective charge cycles of the plurality of power packs.

7. The system of claim 1, wherein the energy control system analyzes the data tracking the respective charge cycles of the plurality of power packs to identify a remaining charge of at least one of the plurality of power packs to optimize the flow of power based on the respective charge cycles of the plurality of power packs.

8. The system of claim 1, wherein the energy control system analyzes the data tracking the respective charge cycles of the plurality of power packs to identify a maintenance need of at least one of the plurality of power packs to optimize the flow of power based on the respective charge cycles of the plurality of power packs.

9. The system of claim 1, further comprising:
a regenerative braking mechanism that is coupled with the plurality of power packs and that supplies electric charge to the plurality of power packs for charging the plurality of power packs.

10. The system of claim 1, wherein the plurality of power packs include at least one battery.

11. The system of claim 1, wherein the plurality of power packs include at least one capacitor.

12. A method for energy management, the method comprising:
controlling, using an energy control system, a flow of power in a system to provide electric charge from a photovoltaic array to a plurality of power packs for charging the plurality of power packs, wherein the photovoltaic array includes a plurality of interconnected photovoltaic cells;
controlling, using the energy control system, the flow of power in the system to provide power from the plurality of power packs for discharging the plurality of power packs;
storing, in a charge management database, data tracking respective charge cycles of the plurality of power packs based on the charging of the plurality of power packs and discharging of the plurality of power packs;
inputting, using the energy control system, the data tracking the respective charge cycles of the plurality of power packs into a trained machine learning model to identify at least one optimization to the flow of power in the system;
optimizing, using the energy control system, the flow of power in the system according to the at least one optimization, wherein the at least one optimization is based on the respective charge cycles of the plurality of power packs as tracked in the data stored in the charge management database;
updating, using the energy control system, the charge management database based on optimization of the flow of power in the system; and
outputting, using an output interface, a status of the plurality of power packs based on the flow of power as optimized.

13. The method of claim 12, wherein the system is an electric vehicle, wherein discharging of the plurality of power packs is used to power propulsion of the electric vehicle, and wherein the electric vehicle includes at least the plurality of power packs, the photovoltaic array, the energy control system, and the output interface.

14. The method of claim 12, wherein the energy control system identifies a modification to the flow of power to identify the at least one optimization to the flow of power, wherein the energy control system uses the modification to the flow of power as training data to update the trained machine learning model.

15. The method of claim 12, wherein the energy control system analyzes the data tracking the respective charge cycles of the plurality of power packs to identify a remaining useful life of at least one of the plurality of power packs to optimize the flow of power based on the respective charge cycles of the plurality of power packs.

16. The method of claim 12, wherein the energy control system analyzes the data tracking the respective charge cycles of the plurality of power packs to identify a remaining charge of at least one of the plurality of power packs to optimize the flow of power based on the respective charge cycles of the plurality of power packs.

17. The method of claim 12, further comprising:
controlling, using the energy control system, the flow of power in the system to provide electric charge from a regenerative braking mechanism for charging the plurality of power packs.

18. A non-transitory computer readable storage medium having embodied thereon a program, wherein the program is executable by a processor to perform a method of energy management, the method comprising:
controlling a flow of power in a system to provide electric charge from a photovoltaic array to a plurality of power packs for charging the plurality of power packs, wherein the photovoltaic array includes a plurality of interconnected photovoltaic cells;
controlling the flow of power in the system to provide power from the plurality of power packs for discharging the plurality of power packs;
storing, in a charge management database, data tracking respective charge cycles of the plurality of power packs based on the charging of the plurality of power packs and discharging of the plurality of power packs;
inputting the data tracking the respective charge cycles of the plurality of power packs into a trained machine learning model to identify at least one optimization to the flow of power in the system;
optimizing the flow of power in the system according to the at least one optimization, wherein the at least one optimization is based on the respective charge cycles of the plurality of power packs as tracked in the data stored in the charge management database;
updating the charge management database based on optimization of the flow of power in the system; and
outputting, using an output interface, a status of the plurality of power packs based on the flow of power as optimized.

19. The system of claim 1, wherein the at least one optimization includes at least one of a change to a charge property or a change to a discharge property.

20. The system of claim 1, wherein the at least one optimization includes at least one of pulse-width modulation (PWM) or maximum power point tracking (MPPT).

* * * * *